United States Patent
Alcock et al.

(10) Patent No.: US 10,846,554 B2
(45) Date of Patent: Nov. 24, 2020

(54) HASH-BASED APPEARANCE SEARCH

(71) Applicant: Avigilon Corporation, Vancouver (CA)

(72) Inventors: Nicholas John Alcock, Vancouver (CA); Seyedmostafa Azizabadifarahani, Vancouver (CA); Alexander Chau, Coquitlam (CA); Roger David Donaldson, Vancouver (CA)

(73) Assignee: Avigilon Corporation, Vancouver (CA)

( * ) Notice: Subject to any disclaimer, the term of this patent is extended or adjusted under 35 U.S.C. 154(b) by 345 days.

(21) Appl. No.: 16/038,034

(22) Filed: Jul. 17, 2018

(65) Prior Publication Data
US 2020/0026949 A1 Jan. 23, 2020

(51) Int. Cl.
*G06K 9/46* (2006.01)
*G06N 20/00* (2019.01)
(Continued)

(52) U.S. Cl.
CPC ........ *G06K 9/46* (2013.01); *G06F 16/2255* (2019.01); *G06F 16/56* (2019.01);
(Continued)

(58) Field of Classification Search
CPC .... G06F 16/2255; G06F 16/532; G06F 16/56; G06F 16/5838; G06F 16/784;
(Continued)

(56) References Cited

U.S. PATENT DOCUMENTS 7,627,171 B2  12/2009  Hampshire, II et al.
8,224,029 B2   7/2012  Saptharishi et al.
(Continued)

FOREIGN PATENT DOCUMENTS

CN  106227851 A  12/2016
CN  108108657 A   6/2018

OTHER PUBLICATIONS

Do, Thanh-Toan, et al., "Simultaneous Feature Aggregating and Hashing for Large-scale Image Search", 2017 IEEE Conference on Computer Vision and Pattern Recognition, IEEE Computer Society, 2017, pp. 4217-4226.
(Continued)

*Primary Examiner* — Manuchehr Rahmjoo
(74) *Attorney, Agent, or Firm* — Daniel Hammond

(57) ABSTRACT

Methods, systems, and techniques for performing a hash-based appearance search. A processor is used to obtain a hash vector that represents a search subject that is depicted in an image. The hash vector includes one or more hashes as a respective one or more components of the hash vector. The processor determines which one or more of the hashes satisfy a threshold criterion and which one or more of the components of the hash vector qualify as a scoring component. The one or more components that qualify correspond to a respective one or more hashes that satisfy the threshold criterion and that are represented in a scoring database that is generated based on different examples of a search target. The processor determines a score representing a similarity of the search subject to the different examples of the search target.

24 Claims, 14 Drawing Sheets

(51) Int. Cl.
  *G06F 16/56* (2019.01)
  *G06F 16/783* (2019.01)
  *G06F 16/22* (2019.01)
  *G06F 16/583* (2019.01)
(52) U.S. Cl.
  CPC ........ *G06F 16/5838* (2019.01); *G06F 16/784* (2019.01); *G06N 20/00* (2019.01)
(58) Field of Classification Search
  CPC .... G06K 9/00771; G06K 9/3233; G06K 9/34; G06K 9/46; G06K 9/6215; G06K 9/627; G06N 20/00; G06N 3/0454; G06N 3/08
  See application file for complete search history.

(56) References Cited

U.S. PATENT DOCUMENTS

| | | | |
|---|---|---|---|
| 8,224,849 | B2 | 7/2012 | Li et al. |
| 8,934,709 | B2 | 1/2015 | Saptharishi et al. |
| 8,983,941 | B1* | 3/2015 | Murphy-Chutorian ............... G06F 16/58 707/723 |
| 9,043,316 | B1 | 5/2015 | Murphy-Chutorian et al. |
| 2006/0212464 | A1 | 9/2006 | Pedersen |
| 2018/0101742 | A1 | 4/2018 | Burge et al. |

OTHER PUBLICATIONS

Mu, Yadong, et al., "Deep Hashing: A Joint Approach for Image Signature Learning", Proceedings of the Thirty-First AAAI Conference on Artificial Intelligence, Association for the Advancement of Artificial Intelligence, 2017, pp. 2380-2386.

Grauman, Kristen, et al., "Learning Binary Hash Codes for Large-Scale Image Search", In Cipolla R., Battiato S., and Farinella G. (eds.), Machine Learning for Computer Vision, Studies in Computational Intelligence, vol. 411, 2013, Springer, Berlin, Heidelberg, pp. 1-39.

International Search Report for International Application No. PCT/CA2019/050811, dated Sep. 11, 2019.

Bromley, Jane, et al. "Signature verification using a "Siamese" time delay neural network." International Journal of Pattern Recognition and Artificial Intelligence 7.04 (1993): 669-688.

Roger Donaldson, Arijit Gupta, Yaniv Plan, and Thomas Reimer, "Random mappings designed for commercial search engines", available at https://arxiv.org/abs/1507.05929.

Xu, Ning, et al. "Deep Grabcut for Object Selection." arXiv preprint arXiv:1707.00243, Jul. 14, 2017.

Nixon, Mark S., et al. "Feature Extraction & Image Processing for Computer Vision." Academic Press, 2002.

Kingma, Diederik P. et al. "Auto-Encoding Variational Bayes." arXiv preprint arXiv:1312.6114, Apr. 10, 2013.

Hand, David J. et al. "Idiot's Bayes—Not So Stupid after All?" International Statistical Review, vol. 69 No. 3, pp. 385-398. Dec. 2001.

Sahami, Mehran, et al. "A Bayesian Approach to Filtering Junk E-Mail." Learning for Text Categorization: Papers from the 1998 Workshop. vol. 62. 1998.

Lau, K. W., et al. "Online Training of Support Vector Classifier." Pattern Recognition 36.8, pp. 913-1920, 2003.

Tan, Songbo. "An Effective Refinement Strategy for K-NN Text Classifier." Expert Systems with Applications 30.2, pp. 290-298, 2006.

Andoni, Alexandr et al. "Near-Optimal Hashing Algorithms for Approximate Nearest Neighbor in High Dimensions." Foundations of Computer Science, 2006. FOCS '06. 47th Annual IEEE Symposium on. IEEE, 2006.

Datar, Mayur, et al. "Locality-Sensitive Hashing Scheme Based on P-Stable Distributions." Proceedings of the Twentieth Annual Symposium on Computational Geometry. ACM, 2004.

Cover, Thomas, et al. "Nearest Neighbor Pattern Classification." IEEE Transactions on Information Theory, vol. 13, No. 1, pp. 21-27, Jan. 1967.

Yang, Liu, and el. "Distance Metric Learning: a Comprehensive Survey." Michigan State University, May 19, 2006.

Weinberger, Kilian Q. et al. "Distance Metric Learning for Large Margin Nearest Neighbor Classification." Advances in Neural Information Processing Systems. 2006.

Gan, Junhao, et al. "Locality-Sensitive Hashing Scheme Based on Dynamic Collision Counting." Proceedings of the 2012 ACM SIGMOD International Conference on Management of Data. ACM, 2012.

\* cited by examiner

1002

| Appearance Search Options | ✕ |
|---|---|
| Appearance Description | Male, Jeans, T-Shirt, Red ∧ |

← 1004

| Type: | ⦿ Persons   ◯ Vehicles |
|---|---|

← 1006

| Gender: | ☐ Female  ☑ Male |
|---|---|
| Age: | Any ▼ |
| Clothing Type: | Jeans, T-Shirt |
| Clothing Color & Pattern: | Red |
| Hair Color: | Any |
| Footwear Color: | Any |
| Accesories: | Any |

HASH-BASED APPEARANCE SEARCH

TECHNICAL FIELD

The present subject-matter relates to video surveillance, and more particularly to performing a hash-based appearance search.

BACKGROUND

Computer implemented visual object classification, also called object recognition, pertains to the classifying of visual representations of real-life objects found in still images or motion videos captured by a camera. By performing visual object classification, each visual object found in the still images or motion video is classified according to its type (such as, for example, human, vehicle, or animal).

Automated security and surveillance systems typically employ video cameras or other image capturing devices or sensors to collect image data such as video or video footage. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in detecting objects such as humans, vehicles, animals, etc. that move through the environment. However, if for example a child is lost in a large shopping mall, it could be very time consuming for security personnel to manually review video footage for the lost child. Computer-implemented detection of objects in the images represented by the image data captured by the cameras can significantly facilitate the task of reviewing relevant video segments by the security personnel in order to find the lost child in a timely manner.

That being said, computer-implemented analysis of video to detect and recognize objects and which objects are similar requires substantial computing resources especially as the desired accuracy increases. It would facilitate computer implementation if the processing could be distributed to optimize resource utilization.

SUMMARY

According to a first aspect, there is provided a method comprising using a processor to: obtain a hash vector representing a search subject depicted in an image, the hash vector comprising one or more hashes as a respective one or more components of the hash vector; determine which one or more of the hashes satisfy a threshold criterion; determine which one or more of the components of the hash vector qualify as a scoring component, wherein the one or more components that qualify as a scoring component correspond to a respective one or more hashes that satisfy the threshold criterion and that are represented in a scoring database that is generated based on different examples of a search target; and determine a score representing a similarity of the search subject to the different examples of the search target used to generate the scoring database, wherein the processor determines the score based on the one or more components of the hash vector that qualify as a scoring component.

The search subject may comprise an entirety of an object of interest, and the different examples of the search target may comprise different images of the object of interest.

The search subject may comprise a facet of an object of interest, and the different examples of the search target may comprise different images of facets of identical type.

The facets that comprise the different examples may also of identical value.

The facet may comprise age, gender, a type of clothing, a color of clothing, a pattern displayed on clothing, a hair color, a footwear color, or a clothing accessory.

Using the processor to obtain the hash vector may comprise using the processor to obtain a hash of a feature vector representing the image.

Using the processor to obtain the hash vector may comprise using the processor to generate the hash vector by multiplying the feature vector by a hashing matrix having entries that are random values. The scoring database may be generated by multiplying the hashing matrix to each of multiple feature vectors representing respective ones of the different examples of the search target.

The method may further comprise: prior to using the processor to determine which one or more of the components of the hash vector qualify as a scoring component, receiving user input instructing the processor to commence a search for the search subject; and after the processor determines the score, depicting the image on a display.

The method may further comprising using the processor to: determine an additional score representing a similarity of an additional search subject depicted in an additional image to the search target; compare the score to the additional score; and display, on a display, one of the image or the additional image as more likely to depict the search target than the other of the image and the additional image according to a result of comparing the score to the additional score.

The scoring database may comprise hash-weight pairs, and each of the hash-weight pairs may relate one of the components of the hash vector that qualifies as a scoring component to a scoring weight.

Using the processor to determine the score may comprise using the processor to determine a sum of the scoring weights.

The image may be acquired using a camera, and the processor may comprise part of a server that is communicatively coupled to the camera.

The image may comprise a portion of a larger image captured by the camera.

According to another aspect, there is provided a method comprising using a processor to: obtain a hash vector training set that comprises training hash vectors representing respective examples of a search target common to training images, each of the training hash vectors comprising one or more hashes as a respective one or more components of the training hash vector; determine which of the one or more hashes satisfy a threshold criterion; and generate a scoring database based on the one or more hashes that satisfy the threshold criterion.

The different examples of the search target may comprise different images of an entirety of an object of interest.

The different examples of the search target may comprise different images of facets of identical type.

The facets that comprise the different examples may also be of identical value.

The facet may comprise age, gender, a type of clothing, a color of clothing, a pattern displayed on clothing, a hair color, a footwear color, or a clothing accessory.

Using the processor to obtain the hash vectors may comprise using the processor to hash feature vectors respectively representing the training images.

Using the processor to obtain the hash vectors may comprise, for each of the hash vectors and a respective one of the feature vectors, using the processor to generate the hash vector by multiplying the feature vector by a hashing matrix having entries that are random values.

Using the processor to generate the scoring database may comprise using the processor to: determine which one or more components of the training hash vectors correspond to the one or more hashes that satisfy the threshold criterion; determine weights to be assigned to components of a hash vector to be scored using the scoring database, wherein the weights to be assigned to components of the hash vector to be scored are determined from a number of hashes at respective components of the training hash vectors that satisfy the threshold criterion; and storing hash-weight pairs in the scoring database, wherein each of the hash-weight pairs relates one of the components of the hash vector to be scored to a respective one of the weights.

Using the processor to determine the weights may comprise, for each component of the hash vector to be scored, summing a number of the hashes at the corresponding component of the training hash vectors that satisfy the threshold criterion.

According to another aspect, there is provided a system, comprising: a camera; a server, comprising: a processor communicatively coupled to the camera; and a non-transitory computer readable medium having stored thereon computer program code that is executable by the processor and that, when executed by the processor, causes the processor to perform the method of any of the foregoing aspects or suitable combinations thereof.

According to another aspect, there is provided a non-transitory computer readable medium having stored thereon computer program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which:

FIGS. 10A and 10B depict various menus that allow a user to select one or more different facets to search using a hash-based appearance search, according to another example embodiment;

Figure 1:
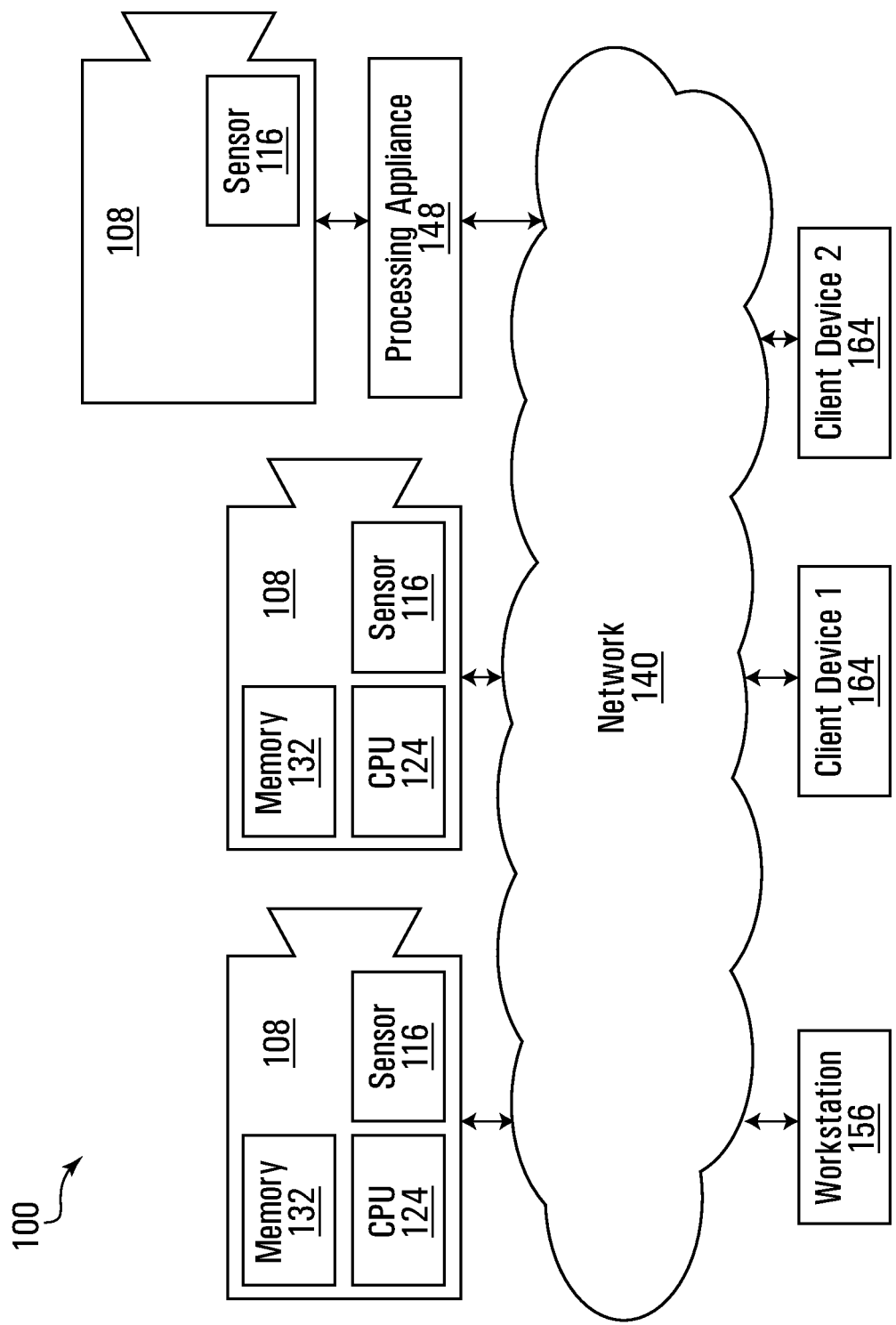
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analysis of images including images in video. For example, processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In some embodiments, the video capture device 108 may be an analog camera connected to an encoder.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a video capture device 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a video capture device 108 which may not have memory 132 or CPU 124 to process image data. The processing appliance 148 may be further connected to the network 140.

According to one exemplary embodiment, and as illustrated in FIG. 1, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
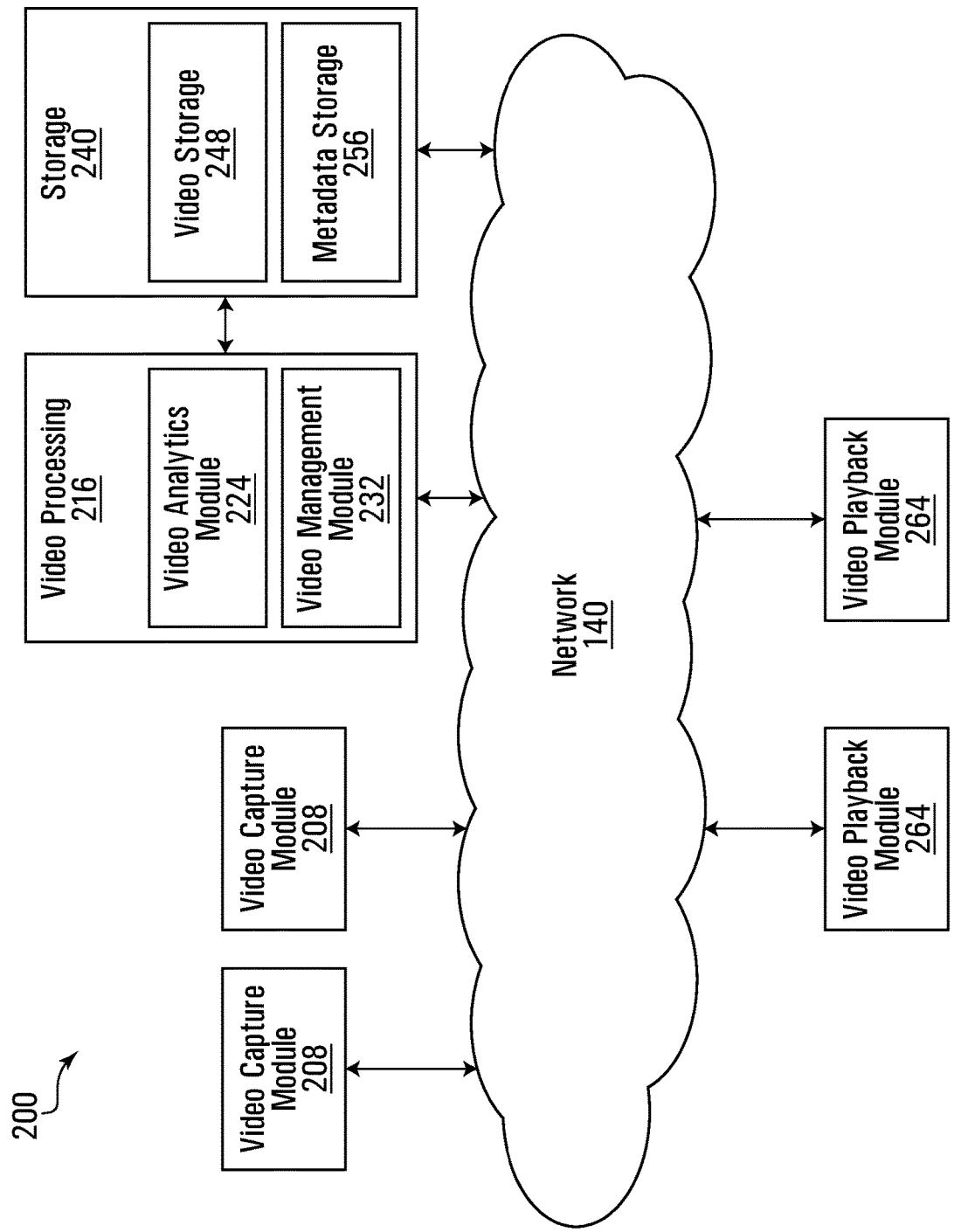
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
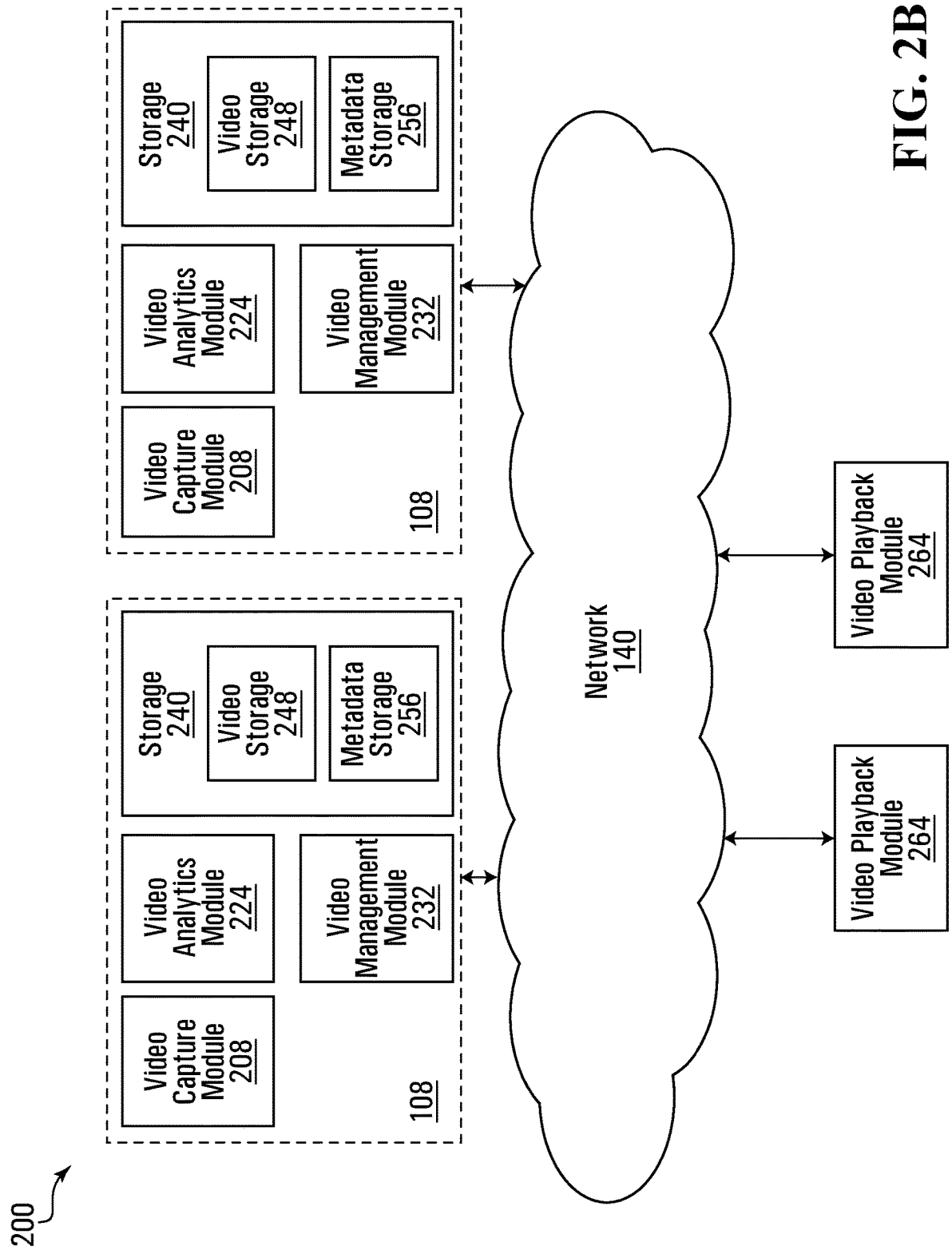
FIG. 2B illustrates a block diagram of a set of operational modules of the video capture and playback system according to one particular example embodiment wherein the video analytics module 224, the video management module 232 and the storage 240 is wholly implemented on the one or more image capture devices 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Figure 3:
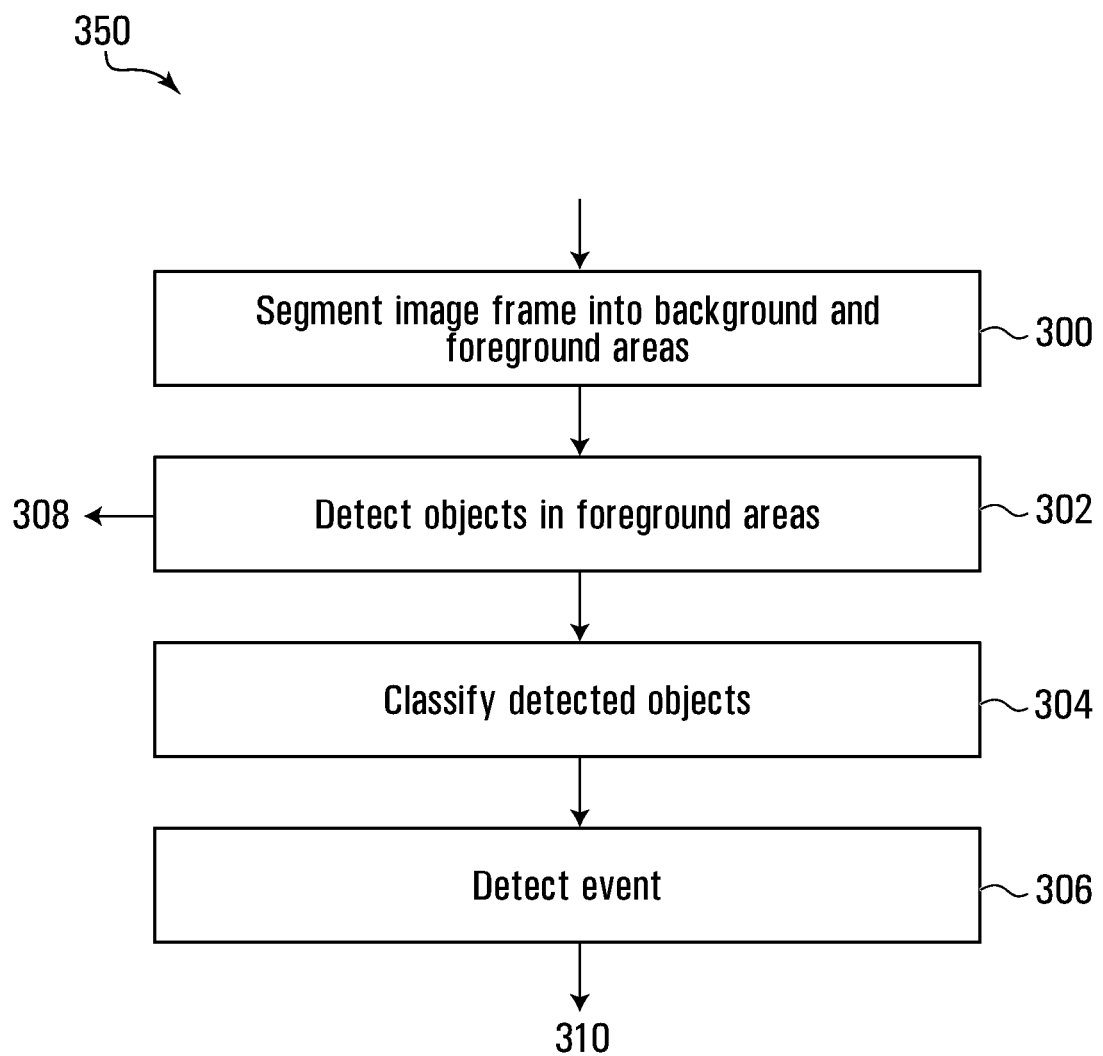
FIG. 3 illustrates a flow diagram of an example embodiment of a method for performing video analytics on one or more image frames of a video captured by a video capture device.

Referring now to FIG. 3, therein illustrated is a flow diagram of an example embodiment of a method 350 for performing video analytics on one or more image frames of a video captured by a video capture device 108. The video analytics is performed by the video analytics module 224 to determine properties or characteristics of the captured image or video and/or of visual objects found in the scene captured in the video.

At 300, at least one image frame of the video is segmented into foreground areas and background areas. The segmenting separates areas of the image frame corresponding to moving objects (or previously moving objects) in the captured scene from stationary areas of the scene.

At 302, one or more foreground visual objects in the scene represented by the image frame are detected based on the segmenting of 300. For example, any discrete contiguous foreground area or "blob" may be identified as a foreground visual object in the scene. For example, only contiguous foreground areas greater than a certain size (such as, for example, number of pixels) are identified as a foreground visual object in the scene.

Metadata may be further generated relating to the detected one or more foreground areas. The metadata may define the location, reference coordinates, classification, attributes of or events associated with the foreground visual object, or object, within the image frame. For example, the location metadata may be further used to generate a bounding box (such as, for example, when encoding video or playing back video) outlining the detected foreground visual object. The image within the bounding box is extracted, called a cropped bounding box (also referred to as a "Chip"), for inclusion in metadata which along with the associated video may be processed further at other devices, such as workstation 156, on the network 140. In short, the cropped bounding box, or Chip, is a cropped portion of an image frame of the video containing the detected foreground visual object. The extracted image, which is the cropped bounding box, alternately may be smaller then what was in the bounding box or may be larger then what was in the bounding box. The size of the image being extracted, for example, should be close to, but outside of, the actual boundaries of the object that has been detected. The bounding boxes are typically rectangular in shape, but may also be irregular shapes which closely outline the objects. A bounding box may, for example, closely follow the boundaries (outline) of a human object.

In a further embodiment, the size of the extracted image is larger than the actual boundaries of the object that has been detected, herein called a Padded cropped bounding box (also referred to as a "Padded Chip"). The Padded cropped bounding box, for example, may be twice the area of the bounding box so that it includes, in whole or in part, objects close to, or overlapping, with the detected foreground visual object. For greater clarity, Padded cropped bounding boxes have larger images then cropped bounding boxes of images of objects within bounding boxes (herein called non-Padded cropped bounding boxes). For clarity, cropped bounding boxes as used herein includes Padded cropped bounding boxes and non-Padded cropped bounding boxes. It will be understood that the image size of the Padded cropped bounding box may vary in size from a little larger (for example 10% larger) to substantially larger (for example 1000% larger).

While the embodiments herein describe the Padded cropped bounding boxes as being expanded non-Padded cropped bounding boxes with extra pixels while still keeping reference coordinates of the original non-Padded cropped bounding box, the expansion or extra pixels may be added more in the horizontal axis instead of the vertical axis. Further, the expansion of extra pixels may be symmetrical or asymmetrical about an axis relative the object. The object of a non-Padded cropped bounding box may be centered in the Padded cropped bounding box as well as the non-Padded cropped bounding box, but some embodiments may off center such objects.

In some embodiments, the cropped bounding boxes, including the Padded cropped bounding boxes and the non-Padded cropped bounding boxes, may be reference coordinates of image frames of the video instead of actual extracted images of image frames of the video. The cropped bounding box images may then be extracted from the image frames when needed. Any one or more of the cropped bounding box images and other images seen by the camera 108 may be sent to the video analytics module 224, which may process them on a server.

A visual indicator may be added to the image frame to visually identify each of the detected one or more foreground visual objects. The visual indicator may be a bounding box that surrounds each of the one or more foreground visual objects within the image frame.

In some example embodiments, the video analytics may further include, at 304, classifying the foreground visual objects (or objects) detected at 302. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. In more specific examples, classifying the visual object may include identifying a person based on facial detection and recognizing text, such as a license plate. Visual classification may be performed according to systems and methods described in co-owned U.S. Pat. No. 8,934,709, which is incorporated by reference herein in its entirety.

The video analytics may further include, at 306, detecting whether an event has occurred and the type of event. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been "left behind" or whether an object in the scene has been removed.

An example of the video analytics, at 306, may be set to detect only humans and, upon such detection, extract cropped bounding boxes of the human objects, with reference coordinates of each of the cropped bounding boxes, for inclusion in metadata, which along with the associated video may be processed 310 further at other devices, such as workstation 156 on the network 140.

Figure 4:
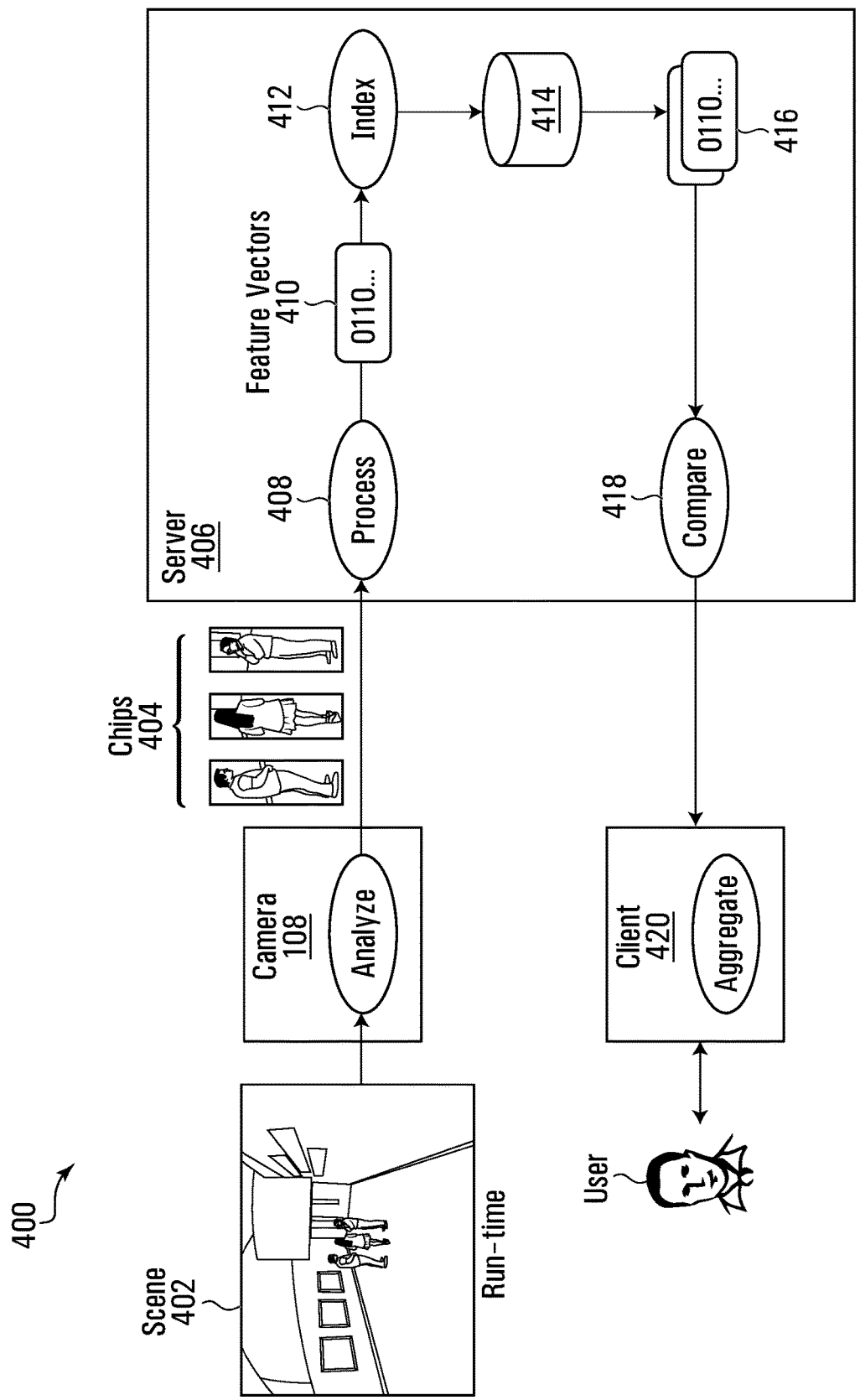
FIG. 4 illustrates a flow diagram of an example embodiment of a method for performing appearance matching to locate an object of interest on one or more image frames of a video captured by a video capture device (camera)

Referring now to FIG. 4, therein illustrated is a flow diagram of an example embodiment of a method 400 for performing appearance matching to locate an object of interest on one or more image frames of a video captured by a video capture device 108 (camera 108). The video is captured by the camera 108 over a period of time. The time could be over hours, days, or months and could be spread over several video files or segments. The meaning of "video" as used herein includes video files and video segments with associated metadata that have indications of time and identify a particular camera 108, in cases when there is more than one camera. The processing of the video is separated into multiple stages and distributed to optimize resource utilization and indexing for subsequent searching of objects (or persons) of interest. The video where such persons of interest are found in the search may then be reviewed by users.

Video of scene 402 is captured by the camera 108. The scene 402 is within the field of view of the camera 108. The video is processed by the video analytics module 224 in the camera 108 to produce metadata with cropped bounding boxes 404. The video analytics module 224 performs the object detection and classification, and also generates images (cropped bounding boxes) from the video that best represent the objects in the scene 402. In this example, the images of the objects, classified as people or humans, are extracted from the video and included in the metadata as cropped bounding boxes 404 for further identification processing. The metadata with the cropped bounding boxes 404 and the video are sent over the network 140 to a server 406. The server 406 may be the workstation 156 or a client device 164.

At the server 406, there are significantly more resources to further Process 408 the cropped bounding boxes 108 and generated Feature Vectors (or "Signatures" or "Binary Representations") 410 to represent the objects in the scene 402. The Process 408 is, for example, known in the art as a feature descriptor.

In computer vision, a feature descriptor is generally known as an algorithm that takes an image and outputs feature descriptions or feature vectors, via an image transformation. Feature descriptors encode information, i.e. an image, into a series of numbers to act as a numerical "fingerprint" that can be used to differentiate one feature from another. Ideally this information is invariant under image transformation so that the features could be found again in another image of the same object. Examples of feature descriptor algorithms are SIFT (Scale-invariant feature transform), HOG (histogram of oriented gradients), and SURF (Speeded Up Robust Features).

A feature vector is an n-dimensional vector of numerical features (numbers) that represent an image of an object that can be processed by computers. By comparing the feature vector of one image of one object with the feature vector of another image, a computer implementable process may determine whether the one image and the other image are images of the same object. The image signatures (or feature vectors, or embedding, or representation, etc.) are multidimensional vectors calculated by (for example convolutional) neural networks.

By calculating the Euclidean distance between the two feature vectors of the two images captured by the camera 108, a computer implementable process can determine a similarity score to indicate the similarity of the two images. The neural networks are trained in such manner that the feature vectors they compute for images are close (low Euclidian distance) for similar images and far (high Euclidian distance) for dissimilar images. In order to retrieve relevant images, the feature vector of the query image is compared with the feature vectors of the images in the database 414. The search results may be shown by ascending order of their distance (value between 0 and 1) to the query image. The similarity score may, for example, be a percentage as converted from the value between 0 and 1.

In this example implementation, the Process 408 uses a learning machine to process the cropped bounding boxes 404 to generate the feature vectors or signatures of the images of the objects captured in the video. The learning machine is for example a neural network such as a convolutional neural network (CNN) running on a graphics processing unit (GPU). The CNN may be trained using training datasets containing millions of pairs of similar and dissimilar images. The CNN, for example, is a Siamese network architecture trained with a contrastive loss function to train the neural networks. An example of a Siamese network is described in Bromley, Jane, et al. "Signature verification using a "Siamese" time delay neural network." International Journal of Pattern Recognition and Artificial Intelligence 7.04 (1993): 669-688, the contents of which is hereby incorporated by reference in its entirety.

The Process 408 deploys a trained model in what is known as batch learning where all of the training is done before it is used in the appearance search system. The trained model, in this embodiment, is a convolutional neural network learning model with one possible set of parameters. There is an infinity of possible sets of parameters for a given learning model. Optimization methods (such as stochastic gradient descent), and numerical gradient computation methods (such as Backpropagation) may be used to find the set of parameters that minimize our objective function (AKA loss function). Contrastive loss function is used as the objective function. This function is defined such that it takes high values when the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model and the set of parameters is not changed once it is deployed onto the appearance search system.

An alternate embodiment for Process 408 is to deploy a learning machine using what is known as online machine learning algorithms. The learning machine would be deployed in Process 408 with an initial set of parameters, however, the appearance search system will keep updating the parameters of the model based on some source of truth (for example, user feedback in the selection of the images of the objects of interest). Such learning machines also include other types of neural networks as well as convolutional neural networks.

The cropped bounding boxes 404 of human objects are processed by the Process 408 to generate Feature Vectors 410. The Feature Vectors 410 are Indexed 412 and stored in a database 414 with the video. The Feature Vectors 410 are also associated with reference coordinates to where the cropped bounding boxes 404 of the human objects may be located in the video. The database 414 storage includes storing the video with time stamps and camera identification as well as the associated metadata with the Feature Vectors 410 of the cropped bounding boxes 404 and reference coordinates to where in the video the cropped bounding boxes 404 are located.

To locate a particular person in the video, a feature vector of the person of interest is generated. Feature Vectors 416 which are similar to the feature vector of the person of interest are extracted from the database 414. The extracted Feature Vectors 416 are compared 418 to a threshold similarity score and those exceeding the threshold are provided to a client 420 for presentation to a user. The client 420 also has the video playback module 264 for the user to view the video associated with the extracted Feature Vectors 416.

In greater detail, the trained model is trained with a pre-defined distance function used to compare the computed feature vectors. The same distance function is used when the trained model is deployed in the appearance search system. The distance function is the Euclidian distance between the feature vectors where the feature vectors are normalized to have unit norms, and thus all feature vectors lie on a unit-norm hypersphere. After computing and storing the feature vectors of the detected objects in the database, searching similar objects is done using an exact nearest neighbor search, exhaustively evaluating the distance from the queried feature vector (feature vector of the object of interest) to all other vectors in the time frame of interest. The search results are returned ranked by descending order of their distance to the queried feature vector.

In an alternate embodiment, an approximate nearest neighbor search may be used. It is similar to its 'exact' counterpart, but it retrieves the most likely similar results without looking at all results. This is faster, but may introduce false negatives. An example of approximate nearest neighbor may use an indexing of a hashing of the feature vectors. An approximate nearest neighbor search may be faster where the number of feature vectors is large such as when the search time frames are long.

For greater certainty, it is understood that an "object of interest" includes a "person of interest".

Figure 5:
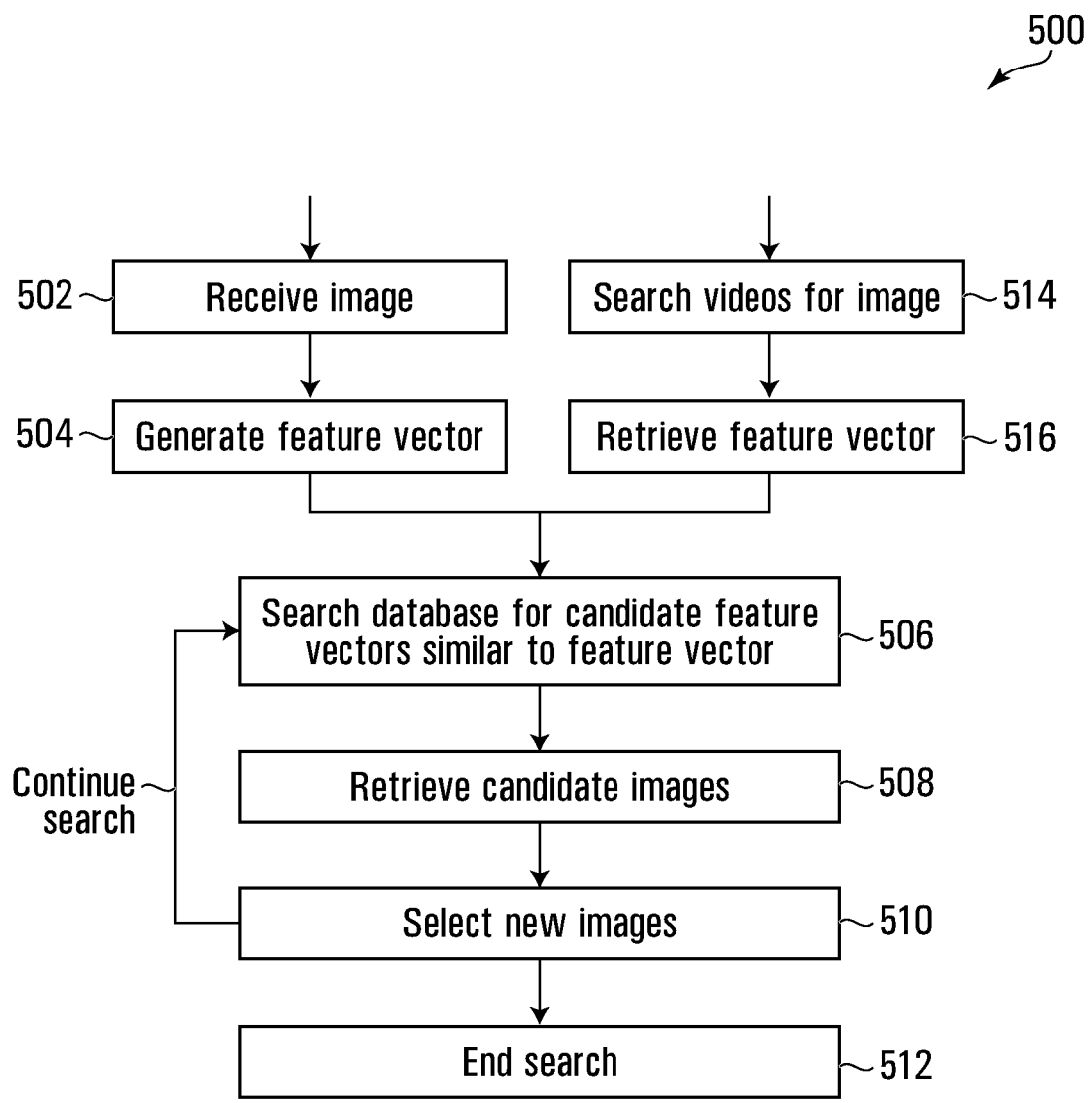
FIG. 5 illustrates a flow diagram of the example embodiment of FIG. 4 showing details of Appearance Search for performing appearance matching at the client to locate videos of an object of interest.

Referring now to FIG. 5, therein illustrated is a flow diagram of the example embodiment of FIG. 4 showing details of Appearance Search 500 for performing appearance matching at the client 420 to locate recorded videos of an object of interest. To initiate an appearance search for an object of interest, a feature vector of the object of interest is needed in order to search the database 414 for similar feature vectors. In Appearance Search 500, there is illustrated two example methods of initiating an appearance search.

In the first method of initiating Appearance Search 500, an image of an object of interest is received 502 at the client 420 where it is sent to the Process 408 to generate 504 a feature vector of the object of interest. In the second method, the user searches 514 the database 414 for an image of the object of interest and retrieves 516 the feature vector of the object of interest which was previously generated when the video was processed for storage in the database 414.

From either the first method or the second method, a search 506 is then made of the database 414 for candidate feature vectors that have a similarity score, as compared with the feature vector of the object of interest, beyond a threshold, which for example could be 70%. The images of the candidate feature vectors are received 508 and then presented at the client 420 for the user to select 510 the images of the candidate features vectors which are or may be of the object of interest. The client 420 tracks the selected images in a list, the list having the images which have been selected by the user as being of the object of interest. Optionally, the user at selection 510 may also remove images, which images have been selected by the user, from the list which were subsequently thought to be incorrect.

With each selection of a new image (or images) of the object of interest at selection 510, the feature vectors of the new images are searched 506 at the database 414 and new candidate images of the object of interest are presented at the client 420 for the user to again select 510 new images which are or may be of the object of interest. This searching loop of Appearance Search 500 may continue until the user decides enough images of the object of interest has been located and ends the search 512. The user may then, for example, view or download the videos associated with the images on the list.

Figure 6:
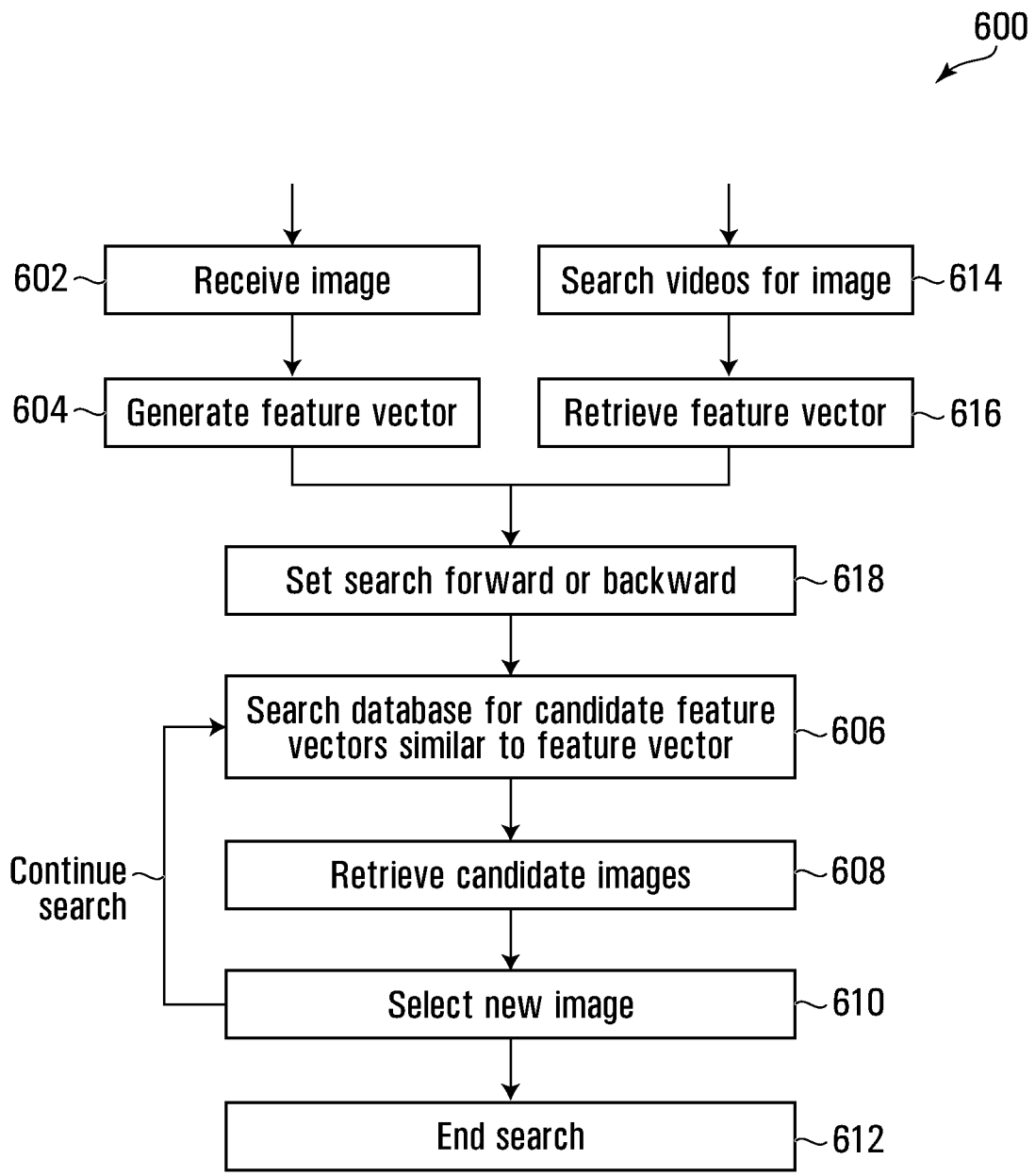
FIG. 6 illustrates a flow diagram of the example embodiment of FIG. 4 showing details of Timed Appearance Search for performing appearance matching at the client 420 to locate recorded videos of an object of interest either before or after a selected time.

Referring now to FIG. 6, therein illustrated is a flow diagram of the example embodiment of FIG. 4 showing details of Timed Appearance Search 600 for performing appearance matching at the client 420 to locate recorded videos of an object of interest either before or after a selected time. This type of search is useful for locating for example a lost bag by locating images closer to the current time and back tracking in time to locate who may have left a bag unattended.

To initial an appearance search for an object of interest, a feature vector of the object of interest is needed in order to search the database 414 for similar feature vectors. In Timed Appearance Search 600, like Appearance Search 500; there are illustrated two example methods for initiating a timed appearance search. In the first method of initiating Appearance Search 600, an image of an object of interest is received 602 at the client 420 where it is sent to the Process 408 to generate 604 a feature vector of the object of interest. In the second method, the user searches 614 the database 414 for an image of the object of interest and retrieves 616 the feature vector of the object of interest which was previously generated when the video was processed before storage in the database 414.

From either the first method or the second method, the Timed Appearance Search 600 is set 618 to search either forward or backward in time. With the first method, a search time may be manually set by the user. With the second method, the search start time is set at the time at which the image was captured by the camera 108. In this example, Timed Appearance Search 600 is set to search forward in time in order to locate for example a lost child closer to the current time. In another example, Timed Appearance Search 600 may be set to search backward in time when the user wishes for instance to determine who may have left a bag (the object of interest) unattended.

A search 606 is then made of the database 414, forward in time from the search time, for candidate feature vectors that have a similarity score, as compared with the feature vector of the object of interest, beyond a threshold, which for example could be 80%. The images of the candidate feature vectors are received 608 and then presented at the client 420 for the user to select 610 one image from the images of the candidate feature vectors which is or may be of the object of interest. The client 420 tracks the selected images in a list. The list comprises the images which have been selected by the user as being of the object of interest. Optionally, the user at selection 610 may also remove images, which images have been selected by the user, from the list which were subsequently thought to be incorrect.

With each selection of a new image of the object of interest at selection 610, the feature vector of the new images is searched 606, forward in time from the search time, at the database 414. The search time is the time at which the new image was captured by the camera 108. The new candidate images of the object of interest are presented at the client 420 for the user to again select 610 another new image which are or may be of the object of interest. This searching loop of the Timed Appearance Search 600 may continue until the user decides enough images of the object of interest have been located and ends the search 612. The user may then, for example, view or download the videos associated with the images on the list. While this example is for a search forward in time, a search backward in time is accordingly similar except the searches of the database 414 are filtered for hits that are backward, or which occurred before, the search time.

Figure 7:
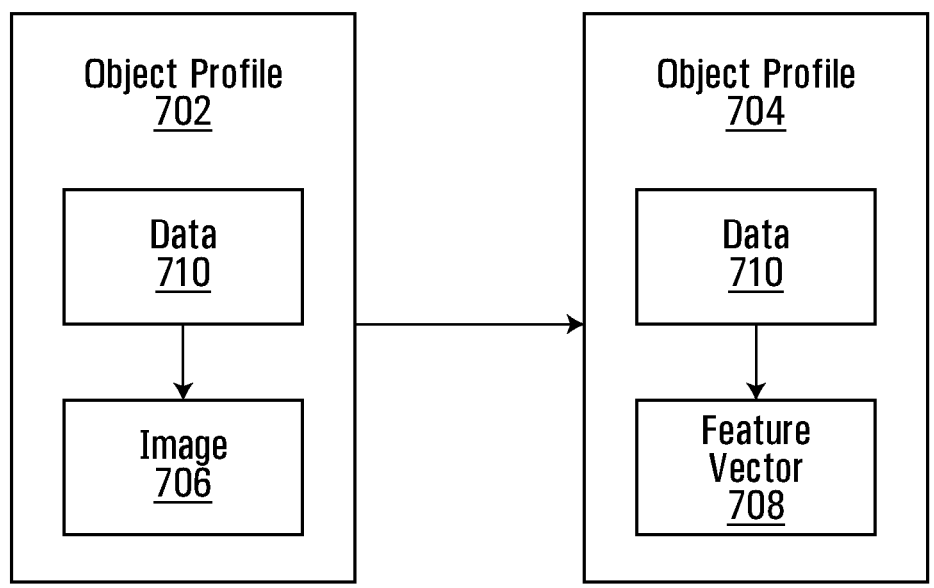
FIG. 7 illustrates block diagrams of example metadata of an Object Profile before storage and the reduced in size Object Profile for storage.

Referring now to FIG. 7, therein illustrated are block diagrams of an example metadata of an Object Profile 702 with cropped bounding box 404 as sent by the camera 108 to server 406 and an example of the Object Profile 704 with the image 706 (cropped bounding box 404) replaced by the feature vector 708 of the cropped bounding box 404 for storage in the database 414. By storing the Object Profile 704 with the feature vector 708 instead of the image 706, some storage space can be saved as the image 706 file size is bigger than the feature vector 708 file size. As a result, significant savings in data storage can be achieved, since the cropped bounding boxes can often be quite large and numerous.

The Data 710 in Object Profile 702 and Object Profile 704 has, for example, content including time stamp, frame number, resolution in pixels by width and height of the scene, segmentation mask of this frame by width and height in pixels and stride by row width in bytes, classification (person, vehicle, other), confidence by percent of the classification, box (bounding box surrounding the profiled object) by width and height in normalized sensor coordinates, image width and height in pixels as well as image stride (row width in bytes), segmentation mask of image, orientation, and x & y coordinates of the image box. The feature vector 708 is a binary representation (binary in the sense of being composed of zeros and ones) of the image 706 with, for example, 48 dimensions: 48 floating point numbers. The number of dimensions may be larger or smaller depending on the learning machine being used to generate the feature vectors. While higher dimensions generally have greater accuracy, the computational resources required may also be very high.

The cropped bounding box 404 or image 706 can be re-extracted from the recorded video using reference coordinates, thus the cropped bounding box 404 does not have to be saved in addition to the video. The reference coordinates may, for example, include time stamp, frame number, and box. As an example, the reference coordinates are just the time stamp with the associated video file where time stamp has sufficient accuracy to allow determination of the original image frame, and where the time stamp does not have sufficient accuracy to allow determination of the original image frame, an image frame close to the original image frame may be sufficient as image frames close in time in a video are generally very similar.

While this example embodiment has the Object Profile 704 replacing a feature vector with an image, other embodiments may have the image being compressed using conventional methods.

Figure 8:
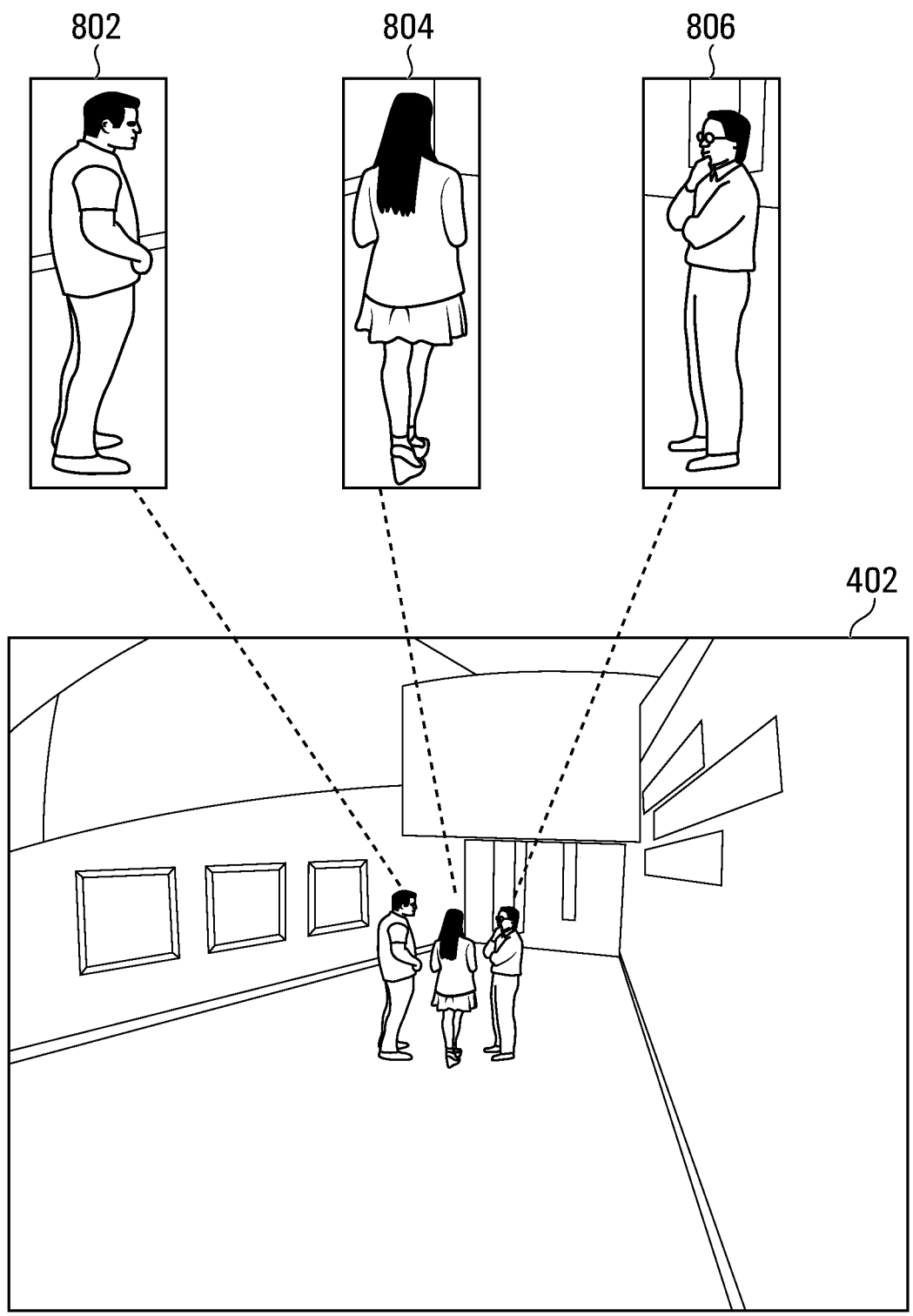
FIG. 8 illustrates the scene and the cropped bounding boxes of the example embodiment of FIG. 4.

Referring now to FIG. 8, therein is illustrated the scene 402 and the cropped bounding boxes 404 of the example embodiment of FIG. 4. There are shown in the scene 402 the three people who are detected. Their images 802, 806, 808 are extracted by the camera 108 and sent to the server 406 as the cropped bounding boxes 404. The images 802, 806, 808 are the representative images of the three people in the video over a period of time. The three people in the video are in motion and their captured images will accordingly be different over a given period of time. To filter the images to a manageable number, a representative image (or images) is selected as the cropped bounding boxes 404 for further processing.

Figure 9:
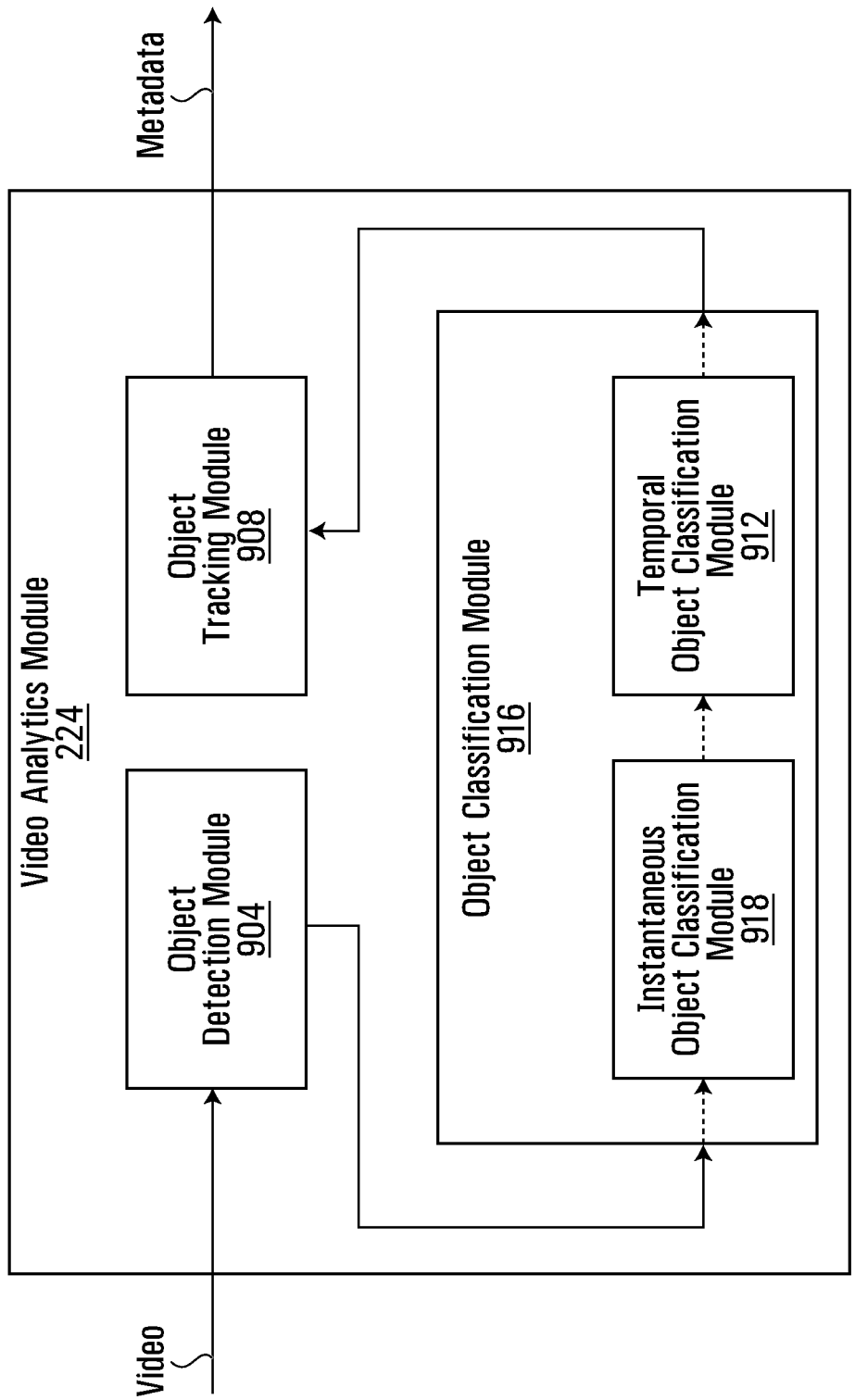
FIG. 9 illustrates a block diagram of a set of operational sub-modules of the video analytics module according to one example embodiment.

Referring now to FIG. 9, therein illustrated is a block diagram of a set of operational sub-modules of the video analytics module 224 according to one example embodiment. The video analytics module 224 includes a number of modules for performing various tasks. For example, the video analytics module 224 includes an object detection module 904 for detecting objects appearing in the field of view of the video capturing device 108. The object detection module 904 may employ any known object detection method such as motion detection and blob detection, for example. The object detection module 904 may include the systems and use the detection methods described in U.S. Pat. No. 7,627,171 entitled "Methods and Systems for Detecting Objects of Interest in Spatio-Temporal Signals," the entire contents of which is incorporated herein by reference.

The video analytics module 224 also includes an object tracking module 908 connected or coupled to the object detection module 904. The object tracking module 908 is operable to temporally associate instances of an object detected by the object detection module 908. The object tracking module 908 may include the systems and use the methods described in U.S. Pat. No. 8,224,029 entitled "Object Matching for Tracking, Indexing, and Search," the entire contents of which is incorporated herein by reference. The object tracking module 908 generates metadata corresponding to visual objects it tracks. The metadata may correspond to signatures of the visual object representing the object's appearance or other features. The metadata is transmitted to the server 406 for processing.

The video analytics module 224 also includes an object classification module 916 which classifies detected objects from the object detection module 904 and connects to the object tracking module 908. The object classification module 916 may include internally, an instantaneous object classification module 918 and a temporal object classification module 912. The instantaneous object classification module 918 determines a visual object's type (such as, for example, human, vehicle, or animal) based upon a single instance of the object. The input to the instantaneous object classification module 916 is preferably a sub-region (for example within a bounding box) of an image in which the visual object of interest is located rather than the entire image frame. A benefit of inputting a sub-region of the image frame to the classification module 916 is that the whole scene need not be analyzed for classification, thereby requiring less processing power. The video analytics module 224 may, for example, filter out all object types except human for further processing.

The temporal object classification module 912 may also maintain class (such as, for example, human, vehicle, or animal) information of an object over a period of time. The temporal object classification module 912 averages the instantaneous class information of the object provided by the instantaneous object classification module 918 over a period of time during the lifetime of the object. In other words, the temporal object classification module 912 determines the object's type based on its appearance in multiple frames. For example, gait analysis of the way a person walks can be useful to classify a person, or analysis of a person's legs can be useful to classify a cyclist. The temporal object classification module 912 may combine information regarding the trajectory of an object (such as, for example, whether the trajectory is smooth or chaotic, or whether the object is moving or motionless) and confidence information of the classifications made by the instantaneous object classification module 918 averaged over multiple frames. For example, classification confidence values determined by the object classification module 916 may be adjusted based on the smoothness of trajectory of the object. The temporal object classification module 912 may assign an object to an unknown class until the visual object is classified by the instantaneous object classification module 918 a sufficient number of times and a predetermined number of statistics have been gathered. In classifying an object, the temporal object classification module 912 may also take into account how long the object has been in the field of view. The temporal object classification module 912 may make a final determination about the class of an object based on the information described above. The temporal object classification module 912 may also use a hysteresis approach for changing the class of an object. More specifically, a threshold may be set for transitioning the classification of an object from unknown to a definite class, and that threshold may be larger than a threshold for the opposite transition (such as, for example, from a human to unknown). The object classification module 916 may generate metadata related to the class of an object, and the metadata may be stored in the database 414. The temporal object classification module 912 may aggregate the classifications made by the instantaneous object classification module 918.

In an alternative arrangement, the object classification module 916 is placed after the object detection module 904 and before the object tracking module 908 so that object classification occurs before object tracking. In another alternative arrangement, the object detection, tracking, temporal classification, and classification modules 904, 908, 912, and 916 are interrelated as described above. In a further alternative embodiment, the video analytics module 224 may use facial recognition (as is known in the art) to detect faces in the images of humans and accordingly provides confidence levels. The appearance search system of such an embodiment may include using feature vectors of the images or cropped bounding boxes of the faces instead of the whole human as shown in FIG. 8. Such facial feature vectors may be used alone or in conjunction with feature vectors of the whole object. Further, feature vectors of parts of objects may similarly be used alone or in conjunction with feature vectors of the whole object. For example, a part of an object may be an image of an ear of a human. Ear recognition to identify individuals is known in the art.

In each image frame of a video, the video analytics module 224 detects the objects and extracts the images of each object. An image selected from these images is referred to as a finalization of the object. The finalizations of the objects are intended to select the best representation of the visual appearance of each object during its lifetime in the scene. A finalization is used to extract a signature/feature vector which can further be used to query other finalizations to retrieve the closest match in an appearance search setting.

The finalization of the object can ideally be generated on every single frame of the object's lifetime. If this is done, then the computation requirements may be too high for appearance search to be currently practical as there are many image frames in even one second of video. The following is an example of filtering of possible finalizations, or the selection of an image from possible images, of an object to represent the object over a period of time in order to reduce computational requirements.

As an Object (a human) enters the scene 402, it is detected by the object detection module 904 as an object. The object classification module 916 would then classify the Object as a human or person with a confidence level for the object to be a human. The Object is tracked in the scene 402 by the object tracking module 908 through each of the image frames of the video captured by the camera 108. The Object may also be identified by a track number as it is being tracked.

In each image frame, an image of the Object within a bounding box surrounding the Object is extracted from the image frame and the image is a cropped bounding box. The object classification module 916 provides a confidence level for the Object as being a human for each image frame, for example. As a further exemplary embodiment, where the object classification module 916 provides a relatively low confidence level for the classification of the Object as being a human (for example) then a Padded cropped bounding box is extracted so that a more computational intensive object detection and classification module (for example Process 408) at a server resolves the Object Padded cropped bounding box before the feature vector is generated. The more computational intensive object detection and classification module may be another neural network to resolve or extract the Object from another overlapping or closely adjacent object. A relatively low confidence level (for example 50%) may also be used to indicate which cropped bounding boxes or Padded cropped bounding boxes should be further processed to resolve issues, such as other objects within the bounding box, before the feature vector is generated. The video analytics module 224 keeps a list of a certain number of cropped bounding boxes, for example the top 10 cropped bounding boxes with highest confidence levels as the Object is tracked in the scene 402. When the object tracking module 908 loses track of the Object or when the Object exits the scene, the cropped bounding box 404 is selected from the list of 10 cropped bounding boxes which shows the Object with the largest number of foreground pixels (or object pixels). The cropped bounding box 404 is sent with the metadata to the server 406 for further processing. The cropped bounding box 404 represents the image of the Object over this tracked period of time. The confidence levels are used to reject cropped bounding boxes which may not represent a good picture of the Object such as when the Object crosses a shadow. Alternatively, more than one cropped bounding box may be picked from the list of top 10 cropped bounding boxes for sending to the server 406. For example, another cropped bounding box selected by the highest confidence level may be sent as well.

A list of the top ten cropped bounding boxes is one implementation. Alternatively, the list could be only five cropped bounding boxes or twenty cropped bounding boxes as further examples. Further, the selection of a cropped bounding box for sending as the cropped bounding box 404 from the list of cropped bounding boxes may occur periodically instead of just after the loss of tracking. Alternatively, the cropped bounding box selection from the list may be based on the highest confidence level instead of on the largest number of object pixels. Alternatively, the video analytics module 224 may be located at the server 406 (the workstation 156), the processing appliance 148, the client device 164, or at other devices off the camera.

The cropped bounding box selection criterion mentioned above are possible solutions to the problem of representing an objects lifetime by a single cropped bounding box. Below is another selection criteria.

Alternatively, filtration of the top ten of n cropped bounding boxes can be performed by using the information provided by a height estimation algorithm of the object classification module 916. The height estimation module creates a homology matrix based on head (top) and foot (bottom) locations observed over a period of time. The period of learning the homology is hereby referred to as a learning phase. The resulting homology is further used to estimate the height of a true object appearing at a particular location and is compared with the observed height of an object at that location. Once the learning is complete, the information provided by the height estimation module can be used to filter out cropped bounding boxes in the top n list by comparing the heights of the cropped bounding boxes with the expected height of an object at the location where the cropped bounding box was captured. This filtering method is intended to be a rejection criterion of cropped bounding boxes which may be false positives with high confidence reported by the object classification module 916. The resulting filtered cropped bounding boxes can then be further ranked by the number of foreground pixels captured by the object. This multi-stage filtration criteria ensures that not only does the finalization of the object have high classification confidence, but is also conformant to the dimensions of the expected object at its location and furthermore, also has a good number of foreground pixels as reported by the object detection module 904. The resulting cropped bounding box from the multi-stage filtration criteria may better represent the appearance of the object during its lifetime in the frame as compared to a cropped bounding box that results from any of the above mentioned criteria applied singularly. The machine learning module herein includes machine learning algorithms as is known in the art.

Hash-Based Appearance Search

In the example embodiments described above, the server 406 determines similarity between any two feature vectors as a Euclidean distance between those feature vectors. For example, in at least some of the example embodiments above, n=48 and determining the Euclidean distance consequently requires a processor to determine a square root of a sum of 48 squares. In at least some of the example embodiments that follow, a processor, such as a processor comprising part of the server 406, performs a hash-based appearance search that does not require the processor to determine the Euclidean distance between feature vectors. The hash-based appearance search may be for an object of interest, such as a person or a vehicle, as described in the example embodiments of FIGS. 1-9. Alternatively, the hash-based appearance search may be for a facet of an object of interest. More particularly, the server 406 in at least some example embodiments is configured to perform a "facet search", where a "facet" describes a particular visually identifiable characteristic of an object of interest. For example, when the server 406 is being used to search for a person of interest, "facets" of that person of interest may comprise any one or more of that person's gender, that person's age range, a type of clothing being worn by that person, a color of that clothing, a pattern displayed on that clothing, that person's hair color, that person's hair length, that person's footwear color, and that person's clothing accessories (such as, for example, a purse or bag).

In at least some of the following example embodiments, the server 406 determines the feature vector of an image depicting a search subject; that is, an image that depicts what may in fact be the object of interest or facet that is desired to be found (a "search target") as a result of performing the search. The server 406 hashes the feature vector to generate a hash vector that comprises one or more hashes corresponding to a respective one or more components of the hash vector. The server 406 then applies a threshold criterion to each of those hashes. The hashes that satisfy the threshold criterion continue to be considered by the server 406, while the server 406 subsequently ignores the hashes that do not. Following the thresholding, the server 406 accesses a scoring database that has been generated based on different examples of the search target to determine whether the hashes that satisfy the threshold criterion are represented in that database. The server 406 then determines a score representing a similarity of the search subject to the different examples of the search target used to generate the scoring database based on how many of the hashes that satisfy the threshold criterion are represented in the scoring database. Ranking can be performed based on scores and used to determine the likelihood that the search subject is in fact an example of the search target.

In at least some of the example embodiments in which the search subject is a facet, the server 406 saves the facet in storage as a data structure comprising a "descriptor" and a "tag". The facet descriptor may comprise a text string describing the type of facet, while the facet tag may comprise a value indicating the nature of that facet. For example, when the facet is hair color, the facet descriptor may be "hair color" and the facet tag may be "brown" or another color drawn from a list of colors. Similarly, when the facet is a type of clothing, the facet descriptor may be "clothing type" and the facet tag may be "jacket" or another clothing type drawn from a list of clothing types.

Figure 10B:
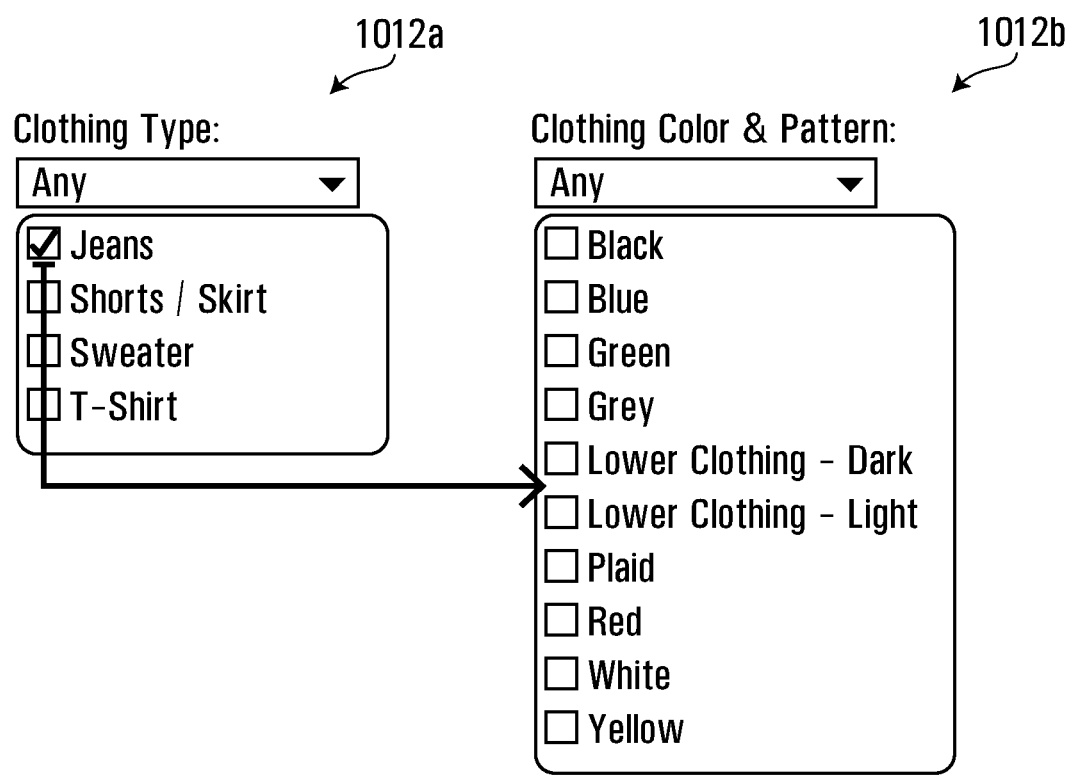

FIGS. 10A and 10B show examples of different facets that a user may select via a user interface on the client 420. The FIG. 10A depicts a facet search menu 1002 that comprises an object of interest selector 1006, which in FIG. 10A are radio buttons allowing the user to select an object of interest in the form of a person (as selected in FIG. 10A) or a vehicle; and various facet selectors 1008. The facet selectors 1008 allow the user to adjust any one or more of a person of interest's gender (selected in FIG. 10A to be male); age range (not specified in FIG. 10A); clothing type (selected in FIG. 10A to be jeans and a T-shirt); clothing color and/or pattern (selected in FIG. 10A to be red); hair color (not specified in FIG. 10A); footwear color (not specified in FIG. 10A); and accessories (not specified in FIG. 10A) such as, for example, whether the person of interest is holding a purse or wearing a hat. In different example embodiments (not depicted), more, fewer, or different facets than those listed in FIG. 10A may be adjustable. The facets the user has selected are summarized in a facet summary line 1004.

FIG. 10B depicts an example clothing type menu 1012a and an example clothing color and/or pattern menu 1012b, which are depicted as example facet selectors 1010 in FIG. 10B. The clothing type menu 1012a allows the user to select any one or more of jeans, shorts/skirt, a sweater, and a T-shirt as facets, and the clothing color and/or pattern menu 1012b allows the user to select any one or more of black, blue, green, grey, dark (lower clothing), light (lower clothing), plaid, red, white, and yellow facets as applied to the person of interest's clothing.

Figure 11:
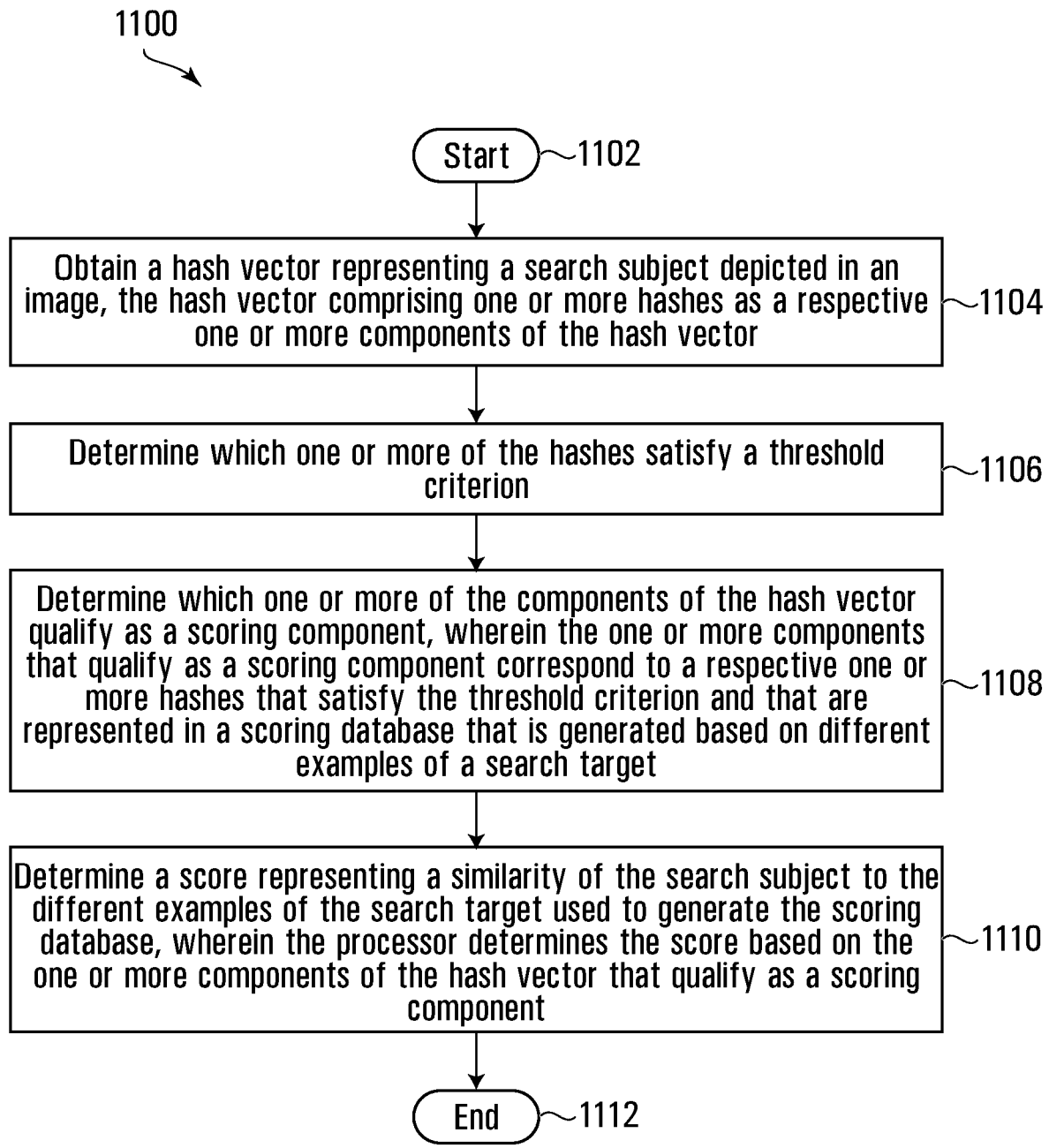
FIG. 11 illustrates a method for performing a hash-based appearance search, according to another example embodiment.

A hash-based appearance search, whether it be for a facet of an object of interest or an object of interest itself, may be performed in accordance with a method 1100 such as that depicted in FIG. 11. The method 1100 is performed by a processor, which in the example embodiment described below comprises part of the server 406. However, in some other example embodiments the processor may comprise part of the camera 108, and in still other example embodiments may comprise part of another component of the system 100 such as the client 420. Alternatively, in some other example embodiments the method 1300 may be performed in a distributed manner, with certain actions of the method 1300 being performed by different processors comprising parts of different components of the system 100.

The server 406 begins performing the method 1100 at block 1102 and proceeds to block 1104. At block 1104, the server 406 obtains a hash vector representing a search subject depicted in an image, with the hash vector comprising one or more hashes as a respective one or more components of the hash vector. In at least some example embodiments, the image is a chip 404 that depicts a single person of interest, and the server 406 is performing a search using the chip 404 to determine whether the person of interest has a particular facet; in this example, the search subject is the facet. In at least some other example embodiments, the image may again be a chip 404 that depicts a single object of interest, such as a person or a vehicle, and the server 406 is performing a search using the chip 404 to identify other images with that object of interest; in this example, the search subject is the object of interest.

For the purposes of illustration, in the presently described example embodiment the server 406 performs a hash-based appearance search with a facet as the search subject. In this example, the facet is a "red shirt"; that is, the facet descriptor is "shirt color" and the facet tag is "red". As described further below, the hash vector is a four component vector with first through fourth components $[x_1 \; x_2 \; x_3 \; x_4]$. The server 406 selects the chip 404 to be characteristic of the person of interest as depicted in a video clip; consequently, the server 406 may process a single chip 404 by applying the method 1100 with the results of that processing being applicable to that video clip as a whole, as opposed to having to process multiple images from that video segment. The chip 404 is not padded in this example; however, in other examples, the chip 404 may be padded.

The server 406 generates a feature vector based on the chip 404 as described above in respect of FIG. 4. In this example embodiment, the feature vector has two components; however, in other example embodiments, the feature vector has more than two components. As mentioned above, more generally the feature vector may be any suitable n-dimensional vector, with n equaling 48 in at least some example embodiments. Further, in at least some example embodiments the numbers comprising the feature vector's components may be normalized to a certain value; for example, they may have a sum of squares equaling one. For an illustrative example, in the present example embodiment n is set equaling two and the feature vector for the chip 404 depicting the search subject ("search subject feature vector") is [0.34, 0.94].

The neural network used to generate the feature vector is trained such that the dot product between any two feature vectors is indicative of the similarity between the chips 404 that the feature vectors represent. For example, the feature vectors of two other chips 404 representing two other video clips may be [0.25, 0.97] and [0.88, 0.47]. The dot product of the search subject feature vector with [0.25, 0.97] is 0.997, which is near the theoretical limit of one when each feature vector's components are normalized to have a sum of squares equaling one. In comparison, the dot product of the search subject feature vector with [0.88, 0.47] is 0.741. The chip 404 represented by the feature vector of [0.25, 0.97] accordingly is more similar to the chip 404 represented by the search subject feature vector than the chip 404 represented by the feature vector of [0.88, 0.47]. The ability of the feature vectors to be used to determine image-image similarity is preserved by the hashing process described below. More generally, the feature vectors are selected such that they may be compared to each other to determine the similarity of the images they represent. In at least some example embodiments, normalizing the feature vectors such that the sum of squares of each of the feature vectors is a certain value, such as one in the presently described example embodiment, allows for this comparison to be made.

In the presently described example embodiment, the server 406 obtains the hash vector by hashing the search subject feature vector. The server 406 does this by multiplying the search subject feature vector by a hashing matrix. The hashing matrix is an m×d matrix, where m is the number of hashes that the resulting hash vector comprises, while d is the number of components the search subject feature vector has. For clarity of illustration, a hashing matrix with m=4 and d=2 is used, below. However, in at least some other example embodiments, m numbers in the thousands or millions and d is larger than 2, as discussed above. The entries of the hashing matrix are random values; more particularly, in this example embodiment, each element is randomly drawn from a standard normal distribution.

In the presently described example embodiment, the hashing matrix is $$\begin{bmatrix} 0.49 & -0.14 \\ 0.65 & 1.52 \\ -0.23 & -0.23 \\ 1.57 & 0.77 \end{bmatrix}.$$

Multiplying the hashing matrix by the search subject feature vector results in a hash vector of [0.35, −0.60, −1.71, −1.11], with 0.35 being the vector's first component, −0.60 being the vector's second component, −1.71 being the vector's third component, and −1.11 being the vector's fourth component.

After determining the hash vector, the server 406 proceeds to block 1106 and determines which one or more of the hashes of the hash vector obtained at block 1104 satisfy a threshold criterion. In the presently described example embodiment, the threshold is that the hash needs to be greater than −1.0. Consequently, the hashes corresponding to the first and second components of the hash vector, which are respectively 0.35 and −0.60, are the only two hashes that satisfy the threshold criterion. Image-image similarity described above in respect of the feature vectors is retained in that other hash vectors whose first and second components also satisfy the threshold criterion are more likely than hash vectors whose first and second components do not satisfy the threshold criterion to also depict the facet shown in the chip 404.

The threshold criterion may be selected, for example, empirically. Additionally or alternatively, the threshold criterion may be selected as described in Roger Donaldson, Arijit Gupta, Yaniv Plan, and Thomas Reimer, "Random mappings designed for commercial search engines", available at <https://arxiv.org/abs/1507.05929>, the entirety of which is hereby incorporated by reference herein.

Following block 1106, the server 406 proceeds to block 1108 and determines which one or more components of the hash vector qualify as a scoring component. The one or more components of the hash vector that qualify as a scoring component correspond to a respective one or more hashes that satisfy the threshold criterion as determined at block 1106 and that are represented in the scoring database, which is generated based on different examples of the search target as described further in respect of FIG. 12 below. In the presently described example embodiment, the scoring database is populated with hash-weight pairs, with each of the hash-weight pairs relating one of the components of the hash vector that qualifies as a scoring component to a scoring weight. For example, in the presently described example embodiment, each hash vector has at most four components. For each of those components that is a scoring component, the scoring database stores a data structure that relates a hash identifier corresponding to one of the hash vector's components, and a weight assigned to that component. In the present example embodiment, the scoring database comprises three hash-weight pairs: a first pair relating a first component of the hash vector to a weight of three; a second pair relating a third component of the hash vector to a weight of two; and a third pair relating a fourth component of the hash vector to a weight of one. The scoring database does not store any hash-weight pair for the hash vector's second component, which reflects that the value of the hash vector's second component is irrelevant to determining whether the search subject is in fact an example of the search target. In at least some different example embodiments, the scoring database may also store a hash-weight pair for the hash vector's second component, with that weight being zero. A component of the hash vector associated with a non-zero weight is accordingly deemed to be "represented" in the scoring database. Consequently, the server 406 determines at block 1108 that the first, third, and fourth components of the hash vector qualify as scoring components.

The server 406 subsequently proceeds to block 1110 and determines a score representing a similarity of the search subject to the different examples of the search target used to generate the scoring database. The server 406 determines the score based on the one or more components of the hash vector that qualify as a scoring component. More particularly, in the presently described example embodiment the server 406 determines a sum of the scoring weights for each of the hash vectors that qualify as a scoring component. In the presently described example embodiment, only the first component of the hash vector qualifies as a scoring component, and consequently the sum of weights and the score is 3. In the presently described example embodiment, a higher score indicates a higher likelihood that the search subject is in fact an example of the facet. However, in at least some different example embodiments, this may not be the case. For example, in an example embodiment in which the weights are negative and are added together, a lower score corresponds to an increased likelihood that the search subject is an example of the facet. Analogously, in some other example embodiments the weights stored in the scoring database may not simply be added together, and may additionally or alternatively be the subject of one or more other mathematical operations. For example, alternatives to summing comprise any of determining the harmonic mean of the weights, the geometric mean of the weights, and the median of the weights. After block 1110, the method 1100 ends at block 1112.

In at least some example embodiments, prior to using the server 406 to determine which one or more of the components of the hash vector qualify as a scoring component, the server 406 may receive user input instructing it to commence a search for the facet. For example, a user may provide input via the client 420, which input is relayed to the server 406, to search multiple video clips for a particular type of object of interest or facet. The server 406 may in response perform the method 1100 of FIG. 11 for multiple chips 404 representing search subjects for different images. The server 406 may compare the scores determined at block 1110 of the method 1100 corresponding to each of the chips 404, and rank the chips 404 according to their scores. One of the chips 404 may then be displayed on a display of the client 420 as being more likely to depict the search target than at least one of the other chips 404 according to a result of comparing the scores.

Figure 12:
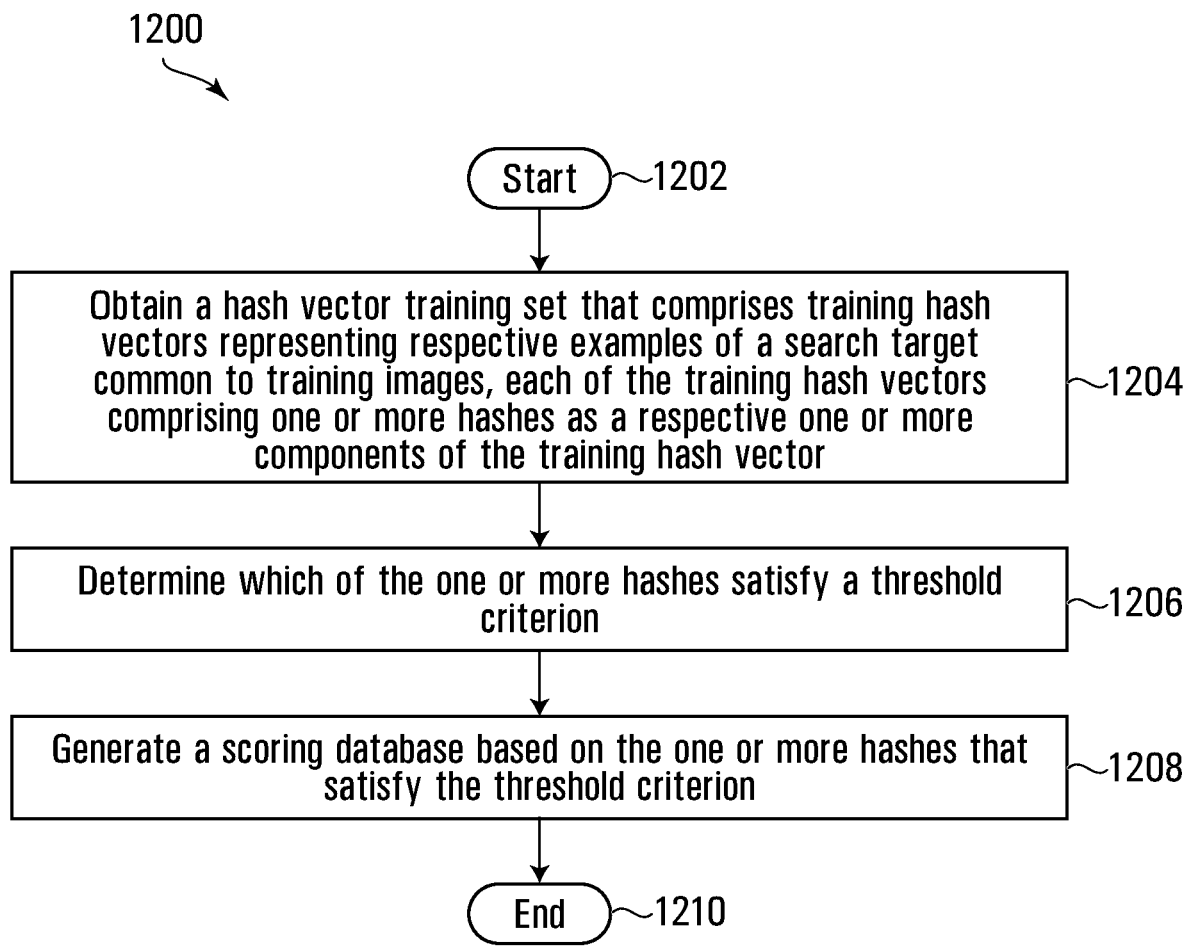
FIG. 12 illustrates a method for populating a scoring database for use in performing a hash-based appearance search, according to another example embodiment.

Referring now to FIG. 12, and as referenced above in the description of FIG. 11, there is depicted a method 1200 for populating the scoring database according to at least some example embodiments. As with the method 1100 of FIG. 11, the method 1200 of FIG. 12 is performed by the server 406 in the presently described example embodiment, although in different example embodiments the method 1200 may be performed by one or more processors resident on the server 406, client 420, camera 108, or another component of the system 100, in a distributed or non-distributed manner.

The method 1200 of FIG. 12 begins at block 1202 and proceeds to block 1204 where the server 406 obtains a hash vector training set that comprises training hash vectors representing respective examples of a search target common to training images. Continuing the example of the "red shirt" facet used in respect of FIG. 11 above, the training hash vectors are derived from respective chips 404 that are different from each other and that have been verified to in fact depict a person wearing a red shirt. Verification may be done, for example, by a user via the client 420. The examples of the search target may vary with the specificity of the search to be done. For example, in the context of the "red shirt" facet used in respect of FIG. 11, all of the facet examples used to generate the hash vector training set may be of identical type (the "shirt" clothing type) and value (red). This may be different in at least some other example embodiments. For example, if the desired facet search is only to find persons wearing a particular type of clothing, such as a dress, without regard for the clothing's color, the example facets may only share a common type. As another example, when the search subject is an object of interest, the different examples of the search target used to generate the training hash vectors may comprise different images of that object of interest. For example, the search subject may be an individual, and the different examples of the search target may comprise images of that individual taken at different times from different video streams. As another example, when the search subject is a facet in the form of a gender, the different examples of the search target may comprise individuals sharing that gender. Similarly, when the search subject is a facet in the form of whether a person is "short" (i.e., below a certain height) or "tall" (i.e., above a certain height), the different examples of the search target may comprise individuals who are either short or who are tall. Additionally or alternatively, when the search subject is an object such as a vehicle that is either or "motorcycle" or a "car", the different examples of the search target may comprise vehicles that are either motorcycles or cars. Additionally or alternatively, when the search subject is an object such as a person in the form of an "employee" and different examples of that object share the same types of facets but those facets may have different values (e.g., different employees may have different heights, genders, and wear different clothes), the different examples of the search target may comprise different examples of that object sharing the same types of facets but exhibiting different values for those facets. More generally, the different examples of the search target may be different examples of any suitable commonality that links those examples. That commonality may comprise, for example, one or more types of facet, and at least some of those different examples may exhibit different values for those one or more types of facet.

The server 406 may obtain each of the training hash vectors in a manner analogous to how it obtains a hash vector at block 1104 of FIG. 11. For example, the server 406 may obtain a feature vector for each training image, with each training image being in the form of a chip 404. The server 406 may then generate the training hash vectors by multiplying the hashing matrix, described in respect of block 1104 above, with feature vectors for the training images. Each multiple is a training hash vector that comprises one or more hashes as a respective one or more of the training hash vector's components.

The server 406 then proceeds to block 1106 where it determines which of the one or more hashes of the training vectors satisfy a threshold criterion. The server 406 applies the threshold criterion to each hash of the training vectors in a manner analogous to that described in respect of block 1106, above.

After applying the threshold criterion, the server 406 proceeds to block 1208 where it generates the scoring database based on the one or more hashes that it determined satisfy the threshold criterion. In the presently described example embodiment, the server 406 determines which one or more components of the training hash vectors correspond to the one or more hashes that satisfied the threshold criterion at block 1206. The server 406 then determines weights to be assigned to components of a hash vector to be scored using the scoring database, with the weights to be assigned to those components determined from a number of hashes at respective components of the training hash vectors that satisfy the threshold criterion. For example, in the presently described example embodiment, the hash vectors of the training images may be [0.75, −2.20, −0.21, −2.13], [0.20, −1.10, −2.20, −0.31], and [−0.25, −1.15, −0.13, −1.45]. Applying the threshold criterion that a hash vector is to exceed −1.0, the first component of the hash vectors comprising the training set satisfy the threshold criterion three times; the second components satisfy the threshold criterion zero times; the third components satisfy the threshold criterion two times; and the fourth components satisfy the threshold criterion once. Each of the hash-weight pairs relates one of the components of the hash vector to be scored to a respective one of the weights. In the presently described example embodiment, the server 406 determines the weight to be applied when scoring each component of the hash vector by summing a number of the hashes at the corresponding component of the training hash vectors that satisfy the threshold criterion. Accordingly, the first component of any hash vector scored using the scoring database is assigned a weight of 3; the second component of that hash vector is assigned a weight of 0; the third component of that hash vector is assigned a weight of 2; and the fourth component of that hash vector is assigned a weight of 0. Hence, the hash vector scored at block 1110 in which only its first and second components satisfy the threshold criterion is assigned a score of 3. After block 1208, the method 1200 ends at block 1210.

As described above in respect of block 1108, in some example embodiments the scoring database may omit any reference to a weight for the second and fourth components, while in other example embodiments the scoring database may expressly assign a weight of zero to each of those components. Additionally, while in the presently described example embodiment the weight to be assigned to each component of a hash vector to be scored is determined by summing the number of times the corresponding components of the training hash vectors satisfy the threshold criterion, in at least some different example embodiments the number of times those corresponding components satisfy the threshold criterion may not simply be added together. Rather, they may additionally or alternatively be the subject of one or more mathematical operations, such as any of determining the harmonic mean of the weights, the geometric mean of the weights, and the median of the weights.

While the above description provides examples of the embodiments with human objects as the primary objects of interest, it will be appreciated that the underlying methodology of extracting cropped bounding boxes from objects, computing a feature vector representation from them and furthermore, using this feature vector as a basis to compare against feature vectors from other objects, is agnostic of the class of the object under consideration. A specimen object could include a bag, a backpack or a suitcase, for example. An appearance search system to locates vehicles, animals, and inanimate objects may accordingly be implemented using the features and/or functions as described herein without departing from the spirit and principles of operation of the described embodiments.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto. Furthermore, any feature of any of the embodiments described herein may be suitably combined with any other feature of any of the other embodiments described herein.

The invention claimed is:

1. A method comprising using a processor to:
   obtain a hash vector representing a search subject depicted in an image, the hash vector comprising one or more hashes as a respective one or more components of the hash vector;
   determine which one or more of the hashes satisfy a threshold criterion;
   determine which one or more of the components of the hash vector qualify as a scoring component, wherein the one or more components that qualify as a scoring component correspond to a respective one or more hashes that satisfy the threshold criterion and that are represented in a scoring database that is generated based on different examples of a search target; and
   determine a score representing a similarity of the search subject to the different examples of the search target used to generate the scoring database, wherein the processor determines the score based on the one or more components of the hash vector that qualify as a scoring component,
   wherein the scoring database comprises hash-weight pairs, each of the hash-weight pairs relating one of the components of the hash vector that qualifies as a scoring component to a scoring weight, and
   wherein using the processor to determine the score comprises using the processor to determine a sum of the scoring weights.

2. The method of claim 1, wherein the search subject comprises an entirety of an object of interest, and wherein the different examples of the search target comprise different images of the object of interest.

3. The method of claim 1, wherein the search subject comprises a facet of an object of interest, and wherein the different examples of the search target comprise different images of facets of identical type.

4. The method of claim 3, wherein the facets that comprise the different examples are also of identical value.

5. The method of claim 3, wherein the facet comprises age, gender, a type of clothing, a color of clothing, a pattern displayed on clothing, a hair color, a footwear color, or a clothing accessory.

6. The method of claim 1, wherein using the processor to obtain the hash vector comprises using the processor to obtain a hash of a feature vector representing the image.

7. The method of claim 6, wherein using the processor to obtain the hash vector comprises using the processor to generate the hash vector by multiplying the feature vector by a hashing matrix having entries that are random values, wherein the scoring database is generated by multiplying the hashing matrix to each of multiple feature vectors representing respective ones of the different examples of the search target.

8. The method of claim 1, further comprising:
prior to using the processor to determine which one or more of the components of the hash vector qualify as a scoring component, receiving user input instructing the processor to commence a search for the search subject; and
after the processor determines the score, depicting the image on a display.

9. The method of claim 8, further comprising using the processor to:
determine an additional score representing a similarity of an additional search subject depicted in an additional image to the search target;
compare the score to the additional score; and
display, on a display, one of the image or the additional image as more likely to depict the search target than the other of the image and the additional image according to a result of comparing the score to the additional score.

10. The method of claim 1, wherein the image is acquired using a camera, and the processor comprises part of a server that is communicatively coupled to the camera.

11. The method of claim 10, wherein the image comprises a portion of a larger image captured by the camera.

12. A system, comprising:
a camera;
a server, comprising:
a processor communicatively coupled to the camera; and
a non-transitory computer readable medium having stored thereon computer program code that is executable by the processor and that, when executed by the processor, causes the processor to perform a method comprising using the processor to:
obtain a hash vector representing a search subject depicted in an image, the hash vector comprising one or more hashes as a respective one or more components of the hash vector;
determine which one or more of the hashes satisfy a threshold criterion;
determine which one or more of the components of the hash vector qualify as a scoring component, wherein the one or more components that qualify as a scoring component correspond to a respective one or more hashes that satisfy the threshold criterion and that are represented in a scoring
database that is generated based on different examples of a search target; and
determine a score representing a similarity of the search subject to the different examples of the search target used to generate the scoring database, wherein the processor determines the score based on the one or more components of the hash vector that qualify as a scoring component,
wherein the scoring database comprises hash-weight pairs, each of the hash-weight pairs relating one of the components of the hash vector that qualifies as a scoring component to a scoring weight, and
wherein using the processor to determine the score comprises using the processor to determine a sum of the scoring weights.

13. The system of claim 12, wherein the search subject comprises an entirety of an object of interest, and wherein the different examples of the search target comprise different images of the object of interest.

14. The system of claim 12, wherein the search subject comprises a facet of an object of interest, and wherein the different examples of the search target comprise different images of facets of identical type.

15. The system of claim 14, wherein the facets that comprise the different examples are also of identical value.

16. The system of claim 14, wherein the facet comprises age, gender, a type of clothing, a color of clothing, a pattern displayed on clothing, a hair color, a footwear color, or a clothing accessory.

17. The system of claim 12, wherein using the processor to obtain the hash vector comprises using the processor to obtain a hash of a feature vector representing the image.

18. The system of claim 17, wherein using the processor to obtain the hash vector comprises using the processor to generate the hash vector by multiplying the feature vector by a hashing matrix having entries that are random values, wherein the scoring database is generated by multiplying the hashing matrix to each of multiple feature vectors representing respective ones of the different examples of the search target.

19. The system of claim 12, wherein the method further comprises:
prior to using the processor to determine which one or more of the components of the hash vector qualify as a scoring component, receiving user input instructing the processor to commence a search for the search subject; and
after the processor determines the score, depicting the image on a display.

20. The system of claim 19, wherein the method further comprises using the processor to:
determine an additional score representing a similarity of an additional search subject depicted in an additional image to the search target;
compare the score to the additional score; and
display, on a display, one of the image or the additional image as more likely to depict the search target than the other of the image and the additional image according to a result of comparing the score to the additional score.

21. The system of claim 12, wherein the image is acquired using the camera, and wherein the image comprises a portion of a larger image captured by the camera.

22. A non-transitory computer readable medium having stored thereon computer program code that is executable by a processor and that, when executed by the processor, causes the processor to perform a method comprising using the processor to:
obtain a hash vector representing a search subject depicted in an image, the hash vector comprising one or more hashes as a respective one or more components of the hash vector;
determine which one or more of the hashes satisfy a threshold criterion;
determine which one or more of the components of the hash vector qualify as a scoring component, wherein the one or more components that qualify as a scoring component correspond to a respective one or more hashes that satisfy the threshold criterion and that are represented in a scoring database that is generated based on different examples of a search target; and
determine a score representing a similarity of the search subject to the different examples of the search target used to generate the scoring database, wherein the processor determines the score based on the one or more components of the hash vector that qualify as a scoring component, wherein the scoring database comprises hash-weight pairs, each of the hash-weight pairs relating one of the components of the hash vector that qualifies as a scoring component to a scoring weight, and wherein using the processor to determine the score comprises using the processor to determine a sum of the scoring weights.

23. The non-transitory computer readable medium of claim 22, wherein using the processor to obtain the hash vector comprises using the processor to obtain a hash of a feature vector representing the image.

24. The non-transitory computer readable medium of claim 23, wherein using the processor to obtain the hash vector comprises using the processor to generate the hash vector by multiplying the feature vector by a hashing matrix having entries that are random values, wherein the scoring database is generated by multiplying the hashing matrix to each of multiple feature vectors representing respective ones of the different examples of the search target.

* * * * *